United States Patent
Ma'As et al.

(10) Patent No.: US 11,693,412 B2
(45) Date of Patent: Jul. 4, 2023

(54) METHOD AND DEVICE FOR NAVIGATING IN DYNAMIC ENVIRONMENT

(71) Applicant: SAMSUNG ELECTRONICS CO., LTD., Suwon-si (KR)

(72) Inventors: Moehammad Dzaky Fauzan Ma'As, Jakarta (ID); Arif Setiawan, Jakarta (ID); Muchlisin Adi Saputra, Jakarta (ID); Shah Dehan Lazuardi, Jakarta (ID); Junaidillah Fadlil, Jakarta (ID); Andreas Kosasih, Jakarta (ID)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 361 days.

(21) Appl. No.: 17/036,024

(22) Filed: Sep. 29, 2020

(65) Prior Publication Data
US 2021/0191405 A1   Jun. 24, 2021

(30) Foreign Application Priority Data
Dec. 20, 2019  (ID) .............................. P00201912199

(51) Int. Cl.
G05D 1/02 (2020.01)
G05D 1/00 (2006.01)
G01C 21/00 (2006.01)

(52) U.S. Cl.
CPC ....... *G05D 1/0214* (2013.01); *G01C 21/3848* (2020.08); *G05D 1/0088* (2013.01); *G05D 1/0238* (2013.01)

(58) Field of Classification Search
CPC .. G05D 1/0214; G05D 1/0088; G05D 1/0238; G01C 21/3848
See application file for complete search history.

(56) References Cited

U.S. PATENT DOCUMENTS 6,836,701 B2 * 12/2004 McKee ................ G05D 1/0297
                                                 701/25
7,211,980 B1 *  5/2007 Bruemmer ........... G05D 1/0274
                                                 318/587

(Continued)

FOREIGN PATENT DOCUMENTS

| KR | 1020170034069 A | 3/2017 |
| KR | 10-1726696 B1 | 4/2017 |
| WO | 2019/028761 A1 | 2/2019 |

OTHER PUBLICATIONS

International Search Report (PCT/ISA/210) and Written Opinion (PCT/ISA/237) dated Dec. 15, 2020 issued by the International Searching Authority in International Application No. PCT/KR2020/012560.

(Continued)

*Primary Examiner* — Ramsey Refai
(74) *Attorney, Agent, or Firm* — Sughrue Mion, PLLC

(57) ABSTRACT

An operating method for navigating a device in a dynamic environment is provided. The method includes building a map based on sensor data, localizing a position of the device on the map based on the sensor data, determining a first position of a moving object on the map based on the sensor data, determining a momentum of the moving object, determining a second position of the moving object on the map based on the determined momentum, and changing the position of the device based on the determined second position of the moving object and a position of at least one obstacle.

20 Claims, 30 Drawing Sheets

(56) References Cited

U.S. PATENT DOCUMENTS

| | | | |
|---|---|---|---|
| 8,830,091 B2 | 9/2014 | Karlsson et al. | |
| 9,400,501 B2 * | 7/2016 | Schnittman | G05D 1/0227 |
| 10,663,972 B2 | 5/2020 | Park et al. | |
| 10,775,794 B2 | 9/2020 | Chae et al. | |
| 11,340,079 B1 * | 5/2022 | Ebrahimi Afrouzi | G06V 20/56 |
| 2014/0058610 A1 * | 2/2014 | Sofman | B25J 9/0003 |
| | | | 701/461 |
| 2014/0129027 A1 * | 5/2014 | Schnittman | G05D 1/0242 |
| | | | 700/253 |
| 2014/0207282 A1 * | 7/2014 | Angle | H04W 4/30 |
| | | | 901/1 |
| 2015/0205299 A1 * | 7/2015 | Schnittman | G05D 1/0227 |
| | | | 901/1 |
| 2016/0188977 A1 * | 6/2016 | Kearns | G06V 40/172 |
| | | | 348/113 |
| 2017/0029213 A1 * | 2/2017 | Johnson | B65G 1/1378 |
| 2017/0190051 A1 | 7/2017 | O'Sullivan et al. | |
| 2018/0074506 A1 * | 3/2018 | Branson | G08G 1/096725 |
| 2018/0095465 A1 * | 4/2018 | Gao | G05D 1/0257 |
| 2018/0211128 A1 | 7/2018 | Hotson et al. | |

OTHER PUBLICATIONS

Gunjal, Pramod R. et al., "Moving Object Tracking using Kalman Filter," 2018 International Conference On Advances in Communication and Computing Technology (ICACCT), Feb. 8, 2018-Feb. 9, 2018, pp. 544-547.

* cited by examiner

Real Condition       Robot's Perspective

Real Condition    Robot's Perspective

A Potentially blocked by C & D

Robot move to avoid blind spot

Image 1
A Potentially go through behind C

Image 2
Robot move to avoid blind spot

METHOD AND DEVICE FOR NAVIGATING IN DYNAMIC ENVIRONMENT

CROSS-REFERENCE TO RELATED APPLICATIONS

The present application claims priority to Indonesian Patent Application No. P00201912199, filed in the Directorate General of Intellectual Property Rights (DGIP) of Indonesia on Dec. 20, 2019. The content of the above-identified document is incorporated herein by reference.

BACKGROUND

1. Field

The present application relates generally to an advanced intelligent remote sensing system for mobile robots, and more particularly to a method and a device for navigating autonomously through a dynamic/unstructured environment.

2. Description of the Related Art

The use of autonomous mobile robots has become increasingly spread out in recent years with the advancements in the capabilities of robotic sensors. Nowadays, the capabilities of the robotic sensors have become richer and richer as more sensors are embedded into robots to adapt to a dynamic or unstructured environment. There are minimum requirements and/or capabilities of an autonomous robot from both software and hardware perspectives.

From the software perspective, the minimum requirements should include the ability to handle computational complexity, and the capability to improve interpretation reliability. For example, handling of the computational complexity may indicate determining the number of operations required for a sensor processing algorithm. Also, for example, improving of the interpretation reliability may indicate solving software interpretation issues. Specifically, the software interpretation issues may include the difficulty of interpreting sensor readings as x-rays, the difficulty of recognizing sensor errors, etc.

From the hardware perspective, at minimum, an autonomous robot should have a field of view (FOV) and range, power consumption, hardware reliability and size, which has to match the payload and power capabilities of a general robot. Yet, the challenges around usefulness of robotic sensors are becoming a multifaceted issue.

Autonomous mobile robots have been generally used for object tracking and guiding and widely used for understanding their surrounding/environment, recognizing objects and interacting with humans. Recently, as the robotics technology becomes more advanced, most robots use various sensors to perform sensing and actuating. The most common practice of an autonomous robot in conducting "object detection" and "object tracking/following" is to utilize cameras and LiDAR sensors, as the minimum requirements. In some cases, additional sensors such as ultrasonic sensors, Camera Time of Flight (ToF) sensors, radars, and other sensors are used.

With the rise of autonomous mobile robots controlled through and/or by "smart devices", there are growing concerns about the privacy of personal data collected by "smart devices". When a robot is used in a public area, there is a possibility that the personal data can be exploited without users' consent. On the contrary, when robots are used in private areas such as homes, hospital rooms, etc., people may feel uncomfortable with the presence of robots equipped with a camera. Even though robotics is already advancing towards personal and/or public future assistant systems, it is important to understand the privacy aspects with respect to users of the robots.

SUMMARY

In one embodiment, an operating method of a device is provided. The operating method includes building a map based on sensor data, localizing a position of the device on the map based on the sensor data, determining a first position of a moving object on the map based on the sensor data; determining a momentum of the moving object, determining a second position of the moving object on the map based on the determined momentum, and changing the position of the device based on the determined second position of the moving object and a position of at least one obstacle.

The moving object may be moved from the first position to the second position.

The sensor data may include data acquired by a perception sensor and an orientation sensor.

The building of the map and the localizing of the position of the device may be performed simultaneously by using Simultaneous Localization and Mapping (SLAM).

The method may further include converting the sensor data into one-dimensional data, analyzing the one-dimensional data by using a Recurrent Neural Network (RNN), and determining a possibility that an object associated with the analyzed one-dimensional data is the moving object.

The determining of the momentum may include determining a speed and a direction of the moving object by using a Kalman filter.

The changing of the position of the device may include moving the device based on the second position of the moving object being blocked by the at least one obstacle.

The at least one obstacle may include a stationary object and another moving object.

The method may further include acquiring the sensor data in response to a selection of a main task.

The method may further include performing the main task based on the acquired sensor data.

In another embodiment, a device is provided. The device includes a first sensor, a second sensor, and at least one processor. The at least one processor is configured to build a map based on sensor data acquired by the first sensor and the second sensor, localize a position of the device on the map based on the acquired sensor data, determine a first position of a moving object on the map based on the acquired sensor data, determine a momentum of the moving object, determine a second position of the moving object on the map based on the determined momentum, and change the position of the device based on the determined second position of the moving object and a position of at least one obstacle.

The at least one processor may be further configured to simultaneously build the map and localize the position of the device by using Simultaneous Localization and Mapping (SLAM).

The at least one processor may be further configured to convert the acquired sensor data into one-dimensional data, analyze the one-dimensional data by using a Recurrent Neural Network (RNN), and determine a possibility that an object associated with the analyzed one-dimensional data is the moving object.

The at least one processor may be further configured to determine a speed and a direction of the moving object by using a Kalman filter.

The at least one processor may be further configured to move the device based on the second position of the moving object being blocked by the at least one obstacle.

The at least one obstacle may include a stationary object and another moving object.

The first sensor and the second sensor may be each configured to acquire the sensor data in response to a selection of a main task and the at least one processor may be further configured to perform the main task based on the acquired sensor data.

In another embodiment, a non-transitory computer-readable recording medium having recorded thereon a program for executing the operating method is provided.

BRIEF DESCRIPTION OF THE DRAWINGS

The above and other objects, features and advantages of the disclosure will become more apparent from the following description of embodiments of the disclosure, taken in conjunction with the accompanying drawings, in which:

FIG. 26 illustrates a flow chart of an operating method of a device according to an embodiment of the disclosure; and.

DETAILED DESCRIPTION

Figure 1:
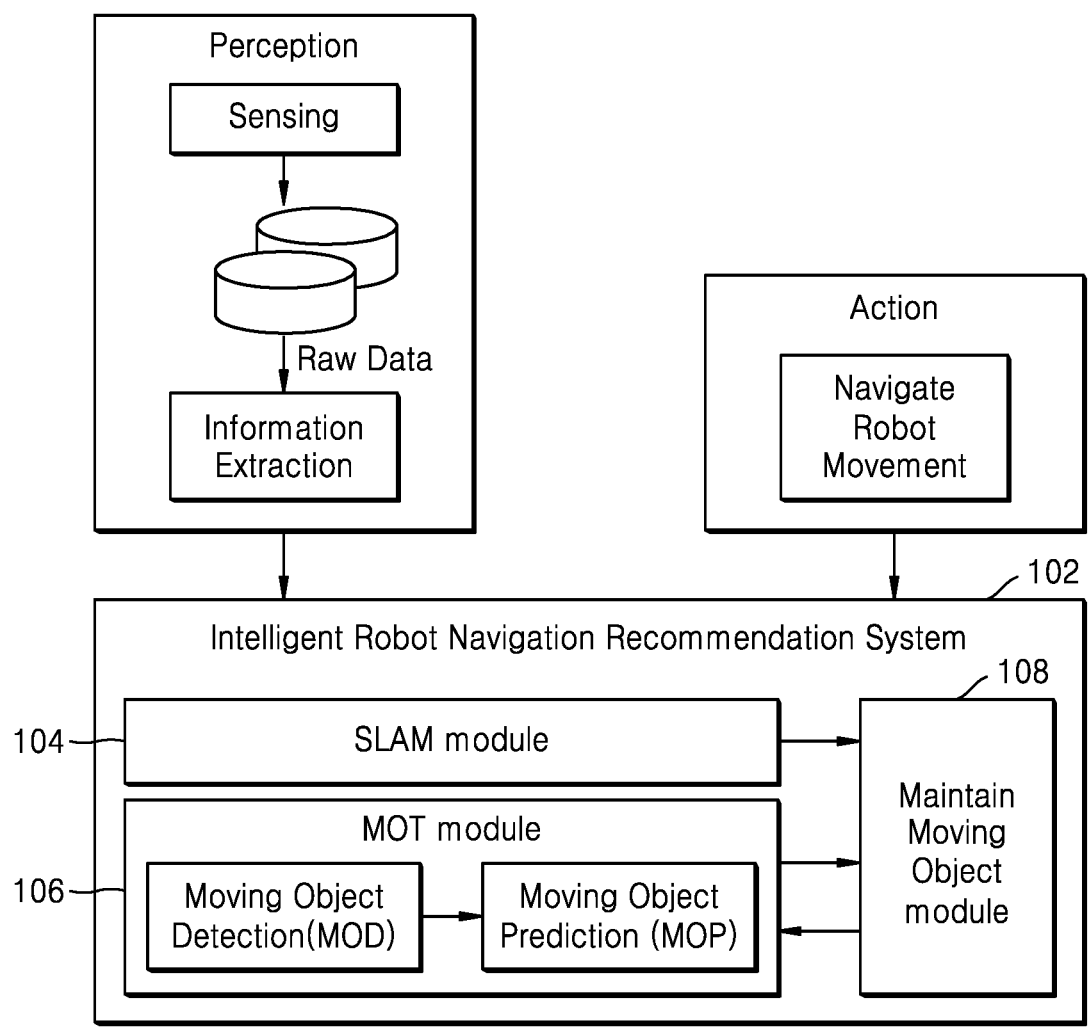
FIG. 1 illustrates a general overview of an intelligent remote sensing system for autonomous robot navigation in dynamic environment utilizing Simultaneous Localization and Mapping (SLAM), Moving Object Detection (MOD), Moving Object Prediction (MOP), and Maintain Moving Object methods in accordance with an embodiment of the disclosure.

Hereinafter, embodiments of the disclosure will be described with reference to the accompany drawings. It should be understood, however, that the description is only illustrative, and is not intended to limit the scope of the disclosure. In addition, the descriptions of well-known structures and techniques are omitted in the following specification in order to avoid unnecessarily obscuring the concept of the disclosure.

It is to be understood by those skilled in the art that singular forms "a", "an", "the" and "said" used herein may also include plural forms unless otherwise indicated. It is to be further understood that the phrase "include/comprise" used in the specification indicates the presence of the said feature, integer, step, operation, element, and/or component, but does not exclude the presence or addition of one or more other features, integers, steps, operations, elements, and/or components. It is to be understood that when an element is referred to as being "connected" or "coupled" to other element, it may be directly connected or coupled to the other element or there may be an intermediate element therebetween. Further, the phrase "connection" or "coupling" as used herein may include a wireless connection or a wireless coupling. The phrase "and/or" as used herein may include all or any of the one or more associated terms listed and all combinations thereof.

Those skilled in the art will appreciate that all the terms including technical and scientific terms used herein have the same meaning as that is commonly understood by those skilled in the art to which the disclosure belongs, unless otherwise defined. It should also be understood that terms such as those defined in a general dictionary should be understood to have the meaning being in consistent with the meaning in the context of the prior art, and will not be explained as idealized or excessively formal meaning, unless specifically defined as herein.

The method and apparatus have the advantage that the apparatus protects human identity around the apparatus as the apparatus optimizes the use of the minimum sensors and can be widely adopted by any mobile robots.

This disclosure provides a system and a method to perform perception sensing to generate real time mapping, localization, and build a robot predictive controller to enable tracking a moving object, including maintaining the distance with the target object in a dynamic environment. This includes maintaining users' privacy aspect, when used in public or private areas. Technology disclosed in this disclosure can be applied to any kind of autonomous mobile robots.

There are already several patents and public papers that explore various machine learning technologies that complement computational calculation in robotic automation, such as real time scene understanding by reconstructing a map, recognizing an object, and so on. However, none of the patents and public papers discuss methods on how to leverage all of these topics into an intelligent system that automatically performs perception sensing and actuating a robot predictive controller to enable autonomous robot navigation.

The disclosure proposes an intelligent autonomous robot navigation system and method that may assemble machine learning methods and computational navigation to automatically provide a mobile robot with autonomous navigation recommendations, only with a perception sensor and an orientation sensor.

The disclosure proposes a new scheme of an advanced intelligent remote sensing system for mobile robots to navigate autonomously through dynamic/unstructured environment with a rangefinder sensor as a perception sensor and an inertial measurement unit as an orientation sensor. The disclosure proposes a novel method on how to enable an autonomous robot with minimum sensors, a single perception/rangefinder sensor and a single orientation sensor/Inertial Measurement Unit (IMU), to perform perception sensing and actuate a model robot predictive controller by providing both autonomous robot and estimation of past, present, and future states of target objects of the autonomous robot. The disclosure provides an autonomous robot which generates real-time mapping and localization by utilizing Simultaneous Localization and Mapping (SLAM) method and calculates a series of measurements observed over time to predict the trajectory of a movement of the target object while generating a trajectory path and maintaining control of a position of the mobile robot with the target object.

In the advanced intelligent remote sensing system, all moving objects within an environment are detected through a Recurrent Neural Network (RNN). The RNN model may learn movement pattern of a particular object from a series of data from a rangefinder sensor with labeled object position. The RNN model may estimate the object location around the robot.

With position information, the distance between the robot and the target object may be measured. The advanced intelligent remote sensing system may estimate an object trajectory to handle challenges such as a situation that the target object is out of range of autonomous robot sensors. The object trajectory is derived from position and velocity vector, which is calculated by a method such as the Kalman Filter that utilizes historical data of target movement and velocity. The advanced intelligent remote sensing system may continuously process and learn information fed into robots to provide robots an autonomous navigation for maintaining the position of the robot with the selected target object.

The disclosure also provides the advanced intelligent remote sensing system which safeguards users' privacy, including users' identity as the advanced intelligent remote sensing system may use no visual sensors to identify, recognize, and understand all objects within an environment.

The present disclosure provides a method and an apparatus for assembling machine learning methods and computational model navigation by sensing and processing all information captured from a perception sensor and an orientation sensor by applying a rangefinder sensor as the perception sensor and an inertial measurement unit as the orientation sensor, utilizing a Simultaneous Localization and Mapping (SLAM) method to generate real time mapping and localization of coordinates of an object such as distance and degree within an environment based on inputs generated by the perception sensor and the orientation sensor, applying a Recurrent Neural Network (RNN) to perform object detection within an environment by analyzing a movement pattern of an object, and generating trajectory estimation by utilizing a predictor using historical data of movement and velocity of the target object.

The present disclosure provides a method and an apparatus for providing recommendation for robot with autonomous navigation model to automatically navigate robots in a dynamic and/or unstructured environment, by generating and continuously updating predictive trajectory path of a target object by calculating a series of measurements observed over time, maintaining control a position of the robot with the target object through various action recommendations to perform certain autonomous tasks such as tracking, following, and/or guiding the target object.

Preferred embodiments and their advantages are best understood by reference to FIGS. 1 through 27. Accordingly, it is to be understood that the embodiments of the disclosure herein described are merely illustrative of the application of the principles of the disclosure. Reference herein to details of the illustrated embodiments is not intended to limit the scope of the claims, which themselves recite those features regarded as essential to the disclosure.

FIG. 1 shows an overview of an intelligent remote sensing system for autonomous robot navigation in a dynamic environment, hereinafter referred to as an intelligent robot navigation system 100, in accordance with an embodiment of the present disclosure. According to FIG. 1, the disclosure provides an intelligent robot navigation system that may help an autonomous robot to navigate autonomously through a dynamic environment by using a minimum number of sensors. Generally, many sensors are installed in a robot body to obtain precise and accurate information and make decisions in robot development. However, there are factors such as privacy, security, and cost that need to be considered. Therefore, considering these factors, the present disclosure provides methods and systems using a rangefinder sensor including a perception sensor and an inertial measurement unit including an orientation sensor.

As described in FIG. 1, there are three stages of processes in accordance with the present disclosure; sensing, processing, and actuating of all available sensors based on data captured by the intelligent robot navigation system 100 of the autonomous robot. In the first stage, the intelligent robot navigation system 100 may perform sensing to obtain real world condition using a rangefinder sensor including a perception sensor and an inertial measurement unit (IMU) including an orientation sensor to control a position and a movement of the autonomous robot. At this stage, all sensor data may undergo an information extraction process to be fed to the next stage. In the second stage, an intelligent robot navigation recommendation system 102, which includes three main modules, a Simultaneous Localization and Mapping (SLAM) module 104, a Multiple Object Tracking (MOT) module 106 and a Maintain Moving Object module 108, is used. The main focus of these modules is to interpret the real world condition by reconstructing in a real time a map without any prior knowledge of the location of the autonomous robot, including identifying objects, determining the trajectory of a moving target object, and finally providing recommendation for robot navigation model. In the last stage, the autonomous robot may use results according to a recommendation of the intelligent robot navigation system 102 to perform certain tasks, such as tracking, following/guiding a target object, and so on.

Figure 2:
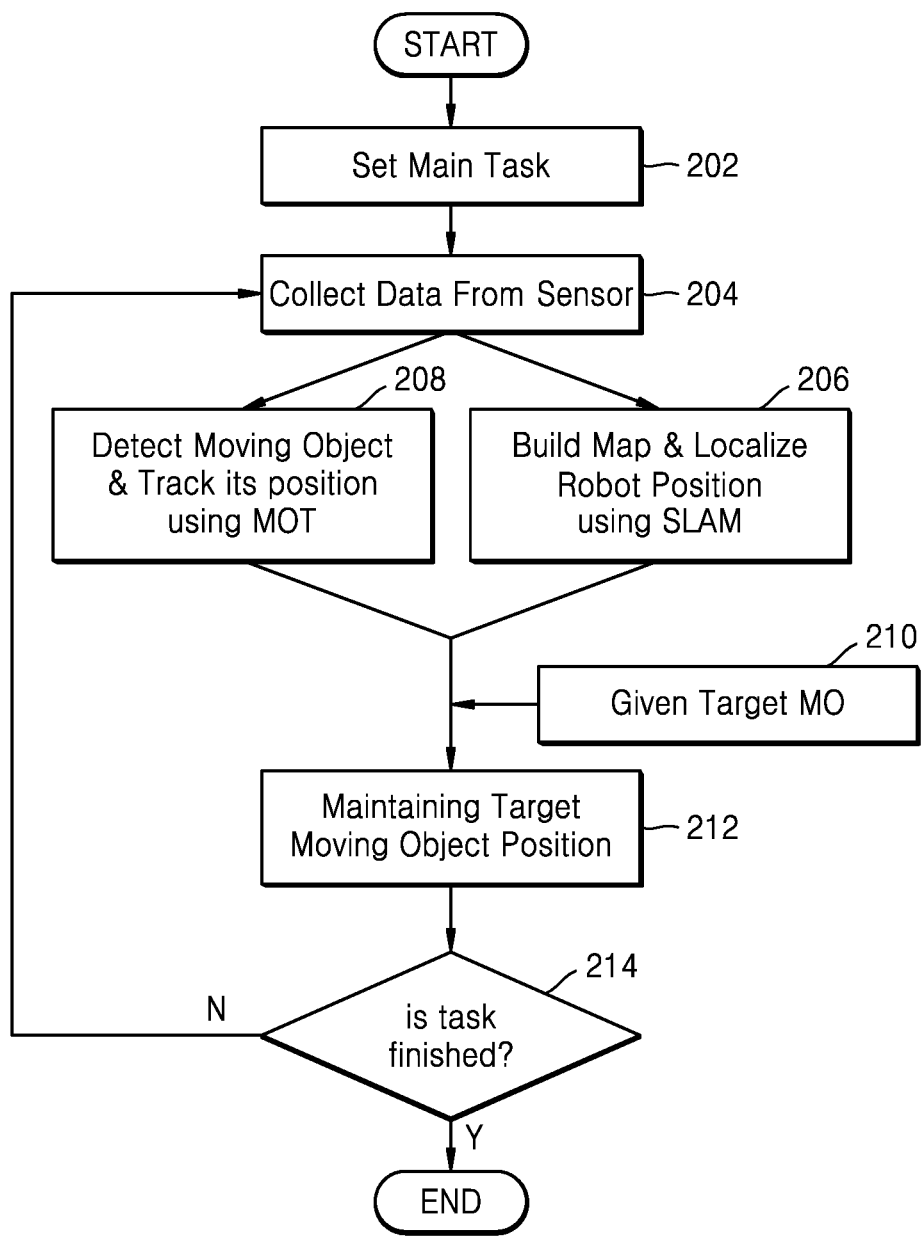
FIG. 2 illustrates a diagram flow of an overall system of FIG. 1, in accordance with an embodiment of the disclosure.

FIG. 2 illustrates an overall system diagram flow of the intelligent robot navigation system 100.

In step 202, a user may set a main task for the autonomous robot via an available user interface (following, guiding, etc.).

In step 204, when the autonomous robot is ready to operate, the autonomous robot may collect data via a rangefinder sensor and an inertial measurement unit sensor.

In step 206, the autonomous robot may use both inputs from the rangefinder sensor and the inertial measurement unit sensor to build a map and localize a robot position using SLAM.

In step 208, the autonomous robot may also use both inputs to detect a moving object and track a position and a momentum of the moving object by using Multiple Object Tracking (MOT) as explained before.

Then, in step 210, the autonomous robot may be given a target moving object.

In step 212, the autonomous robot may maintain the target moving object at a distance from a user. When the target moving object is unreachable, the autonomous robot may move to a certain position to get better perception of the target moving object.

In step 214, the autonomous robot may determine whether the task is finished. If the task is finished ('Y' in step 214), the autonomous robot may stop maintaining the target object at the distance from the user. If the task is not finished ('N' in step 214), the autonomous robot may return to step 204 to collect data from the sensors.

FIG. 3 through FIG. 8 illustrate various user scenarios that describe how the intelligent robot navigation system is used. This disclosure may enable the autonomous robot to be used in various situations in daily human life, not only limiting the usage of the robot in factory to perform preprogrammed repetitive task. In a factory, a robot is designed and developed to perform a specific repetitive task. The robot in a factory does not have the ability to do an action with the situation happened in the environment. For example, in a car manufacturer factory, a robot is used to weld some component into a chassis of a car. The robot may repetitively weld the component, as welding of the component is a main task of the robot. When something such as an accident happens, the robot cannot react to stop the process unless an operator turns off the robot.

When a robot needs to interact with human, the robot needs the perception capability to understand the dynamic change of environment. Then, intelligence needs to be added to make the robot have an intelligence action, which can be a move for the robot, triggering an alert, or giving guidance or help. This disclosure does not limit the action of the robot, but this disclosure enables the autonomous robot to be able to have perception of the environment, tracking or detecting a moving object, then to do several actions.

Figure 3:
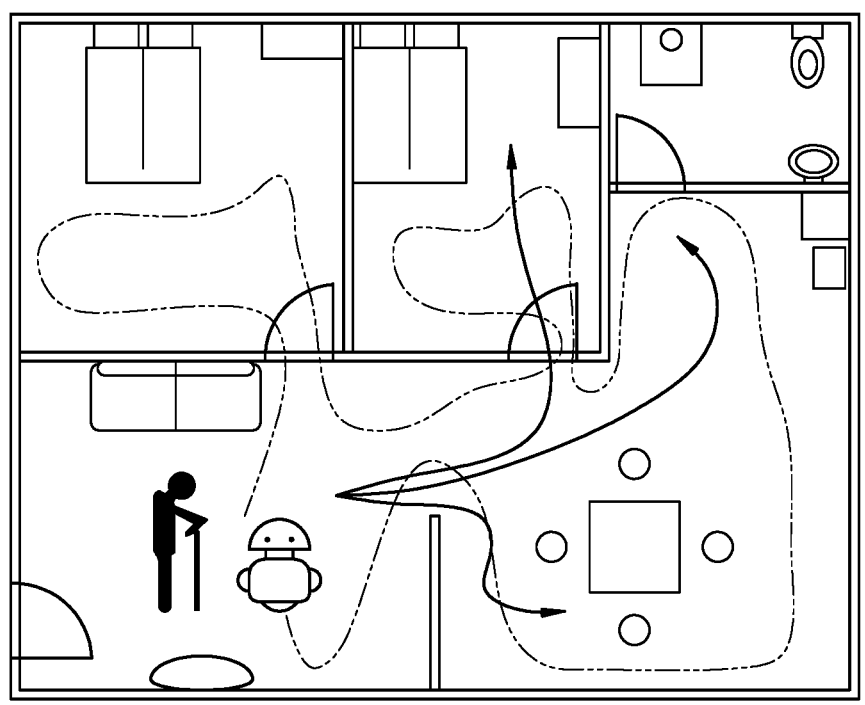
FIG. 3 shows a case illustrating a scenario of an autonomous robot for elderly care.

Referring now to FIG. 3, it describes a sample scenario of the autonomous robot used for elderly care at home. The needs of a robot at home may increase because of the changes in the human life style. The phenomenon of having a small number of family members is increasing, and in some cases, new couples are having fewer children. Three-generation households were common in the past. The family members have more interaction by giving help one to another or sharing some tasks. For example, a grandmother/grandfather takes care of his grandson or a grandson takes care of his grandfather/grandmother, by reminding the elderly for medicine, guiding them when they are moving, or just simply having chat with them. But nowadays, as the number of family members becomes lesser, the presence of an autonomous robot that has the capabilities to nurse, taking care of an elderly person, act as a butler, or simply just a companion to the family member will be essential.

As illustrated in FIG. 3, the main task of the autonomous robot is taking care of an elderly person, who is left alone at home as other family members may have to be outside of the home or they have their task. Both of the parents need to go to work, the children need to go to school, and leaving the elderly person at home alone. The autonomous robot may determine the layout of the home. The autonomous robot may detect a moving object and may be able to follow the moving object. The autonomous robot may also act as a walking assistant device to help the elderly person with walking difficulty.

Figure 4:
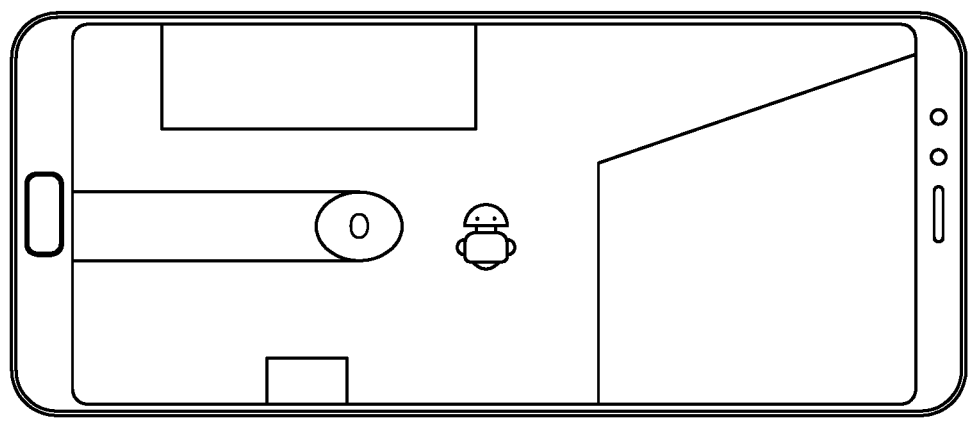
FIG. 4 shows a case illustrating visualization of robot perception and probability of a moving object.

Referring now to FIG. 4, it visualizes perception of an autonomous robot. Although FIG. 4 does not explicitly show a probability of a position of a moving object, mobile devices may show the probability of the position of the moving object with the map. When the robot is started or turned on, the robot may start to use a rangefinder sensor of the robot to measure the distance between a position of the robot and all of objects surrounding the robot. The robot may then try to move around the room to have better perception about the layout of the house using a SLAM method. At the same time, the robot may detect if there is an object that is moving or not. The method used for detecting the moving object comprises converting the rangefinder result data into one-dimensional data, and then analyzing the one-dimensional data by using an RNN to determine the possibilities that the scanned object is a moving object. The result of the RNN process is object(s) with the probability value that the object is moving. The visualization of the map and the probability of the object are shown on mobile devices. The robot then may be assigned to maintain its distance with one of the objects. The robot may follow the object, which in this case is an elderly person, and ensure that the elderly person is safe at home. The robot may also be programmed to give guidance, for a case where the robot needs to take care of elderly people with physical disabilities. The robot may maintain a certain amount of distance, ensuring that the robot may be used as walking assistance, and giving guidance when the elderly person needs to move between rooms in the house.

Figure 5:
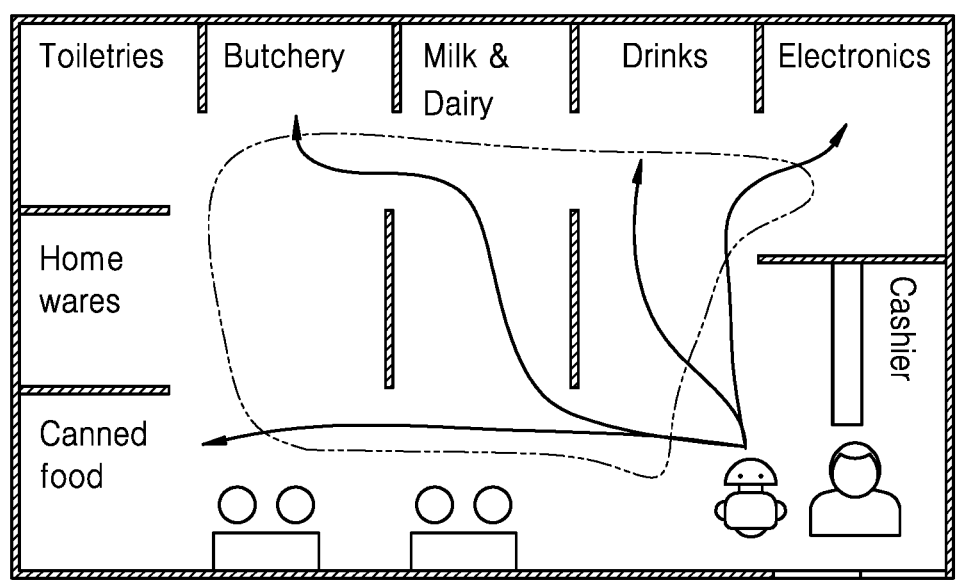
FIG. 5 shows a case illustrating a scenario of an autonomous robot in a retail store.
Figure 6:
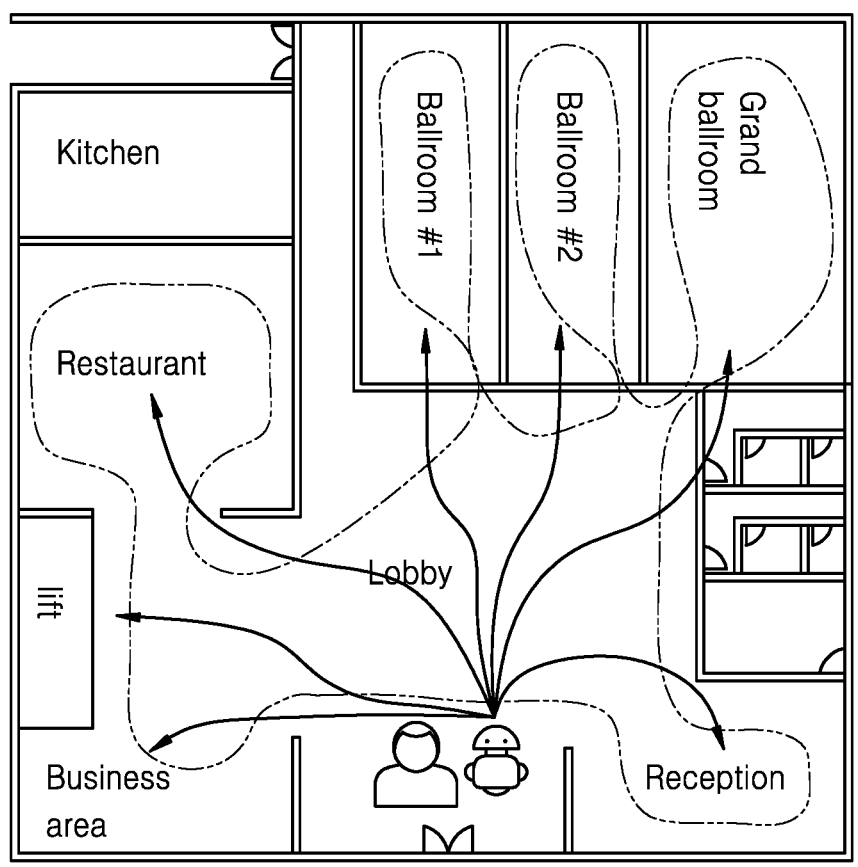
FIG. 6 shows a case illustrating a scenario of an autonomous robot as hotel receptionist.

FIG. 5 and FIG. 6 describe use case scenarios of autonomous robots used in retail store as a frontliner or as a receptionist of a hotel or public building. When entering a public building, especially for the first visit to the building, people will ask reception or information staff when they are in a hurry to find a specific room in the building. Most of the buildings provide a directory with a map of the building. But, for most of the people, reading the guide, understanding the map and remembering the path to reach the destination are not easy. People feel more comfortable and easy by asking an information officer, and then the officer can easily give the guidance to the place they need to go. For some situation, it is even more convenient for the people if the reception staff can give guide assistance until they can reach the room. This kind of service is part of hospitality service that really is needed for hotel, hospital, or retail store. This service results in extra cost for training and managing the staff. Some public services, such as hotel, bus station, airport, even need to have 24 hour reception or information staff.

In these illustrations, hospitality service industry can be easily replaced by an autonomous robot. With this disclosure, the autonomous robots may be trained and programmed to perform certain tasks. As a use case scenario, robots may be deployed on the building to scan the entire room and layout. Using the rangefinder sensor, a robot may build a map of the building. Once the map is built, the robot may be trained to know the name of each room in the building. An interaction, either by voice or touch mechanism, may be used to make the robot understand task of the robot. A user can mention the room name, and the robot may translate the voice into text, and find a matching room name within the building. Alternatively, the robot may be provided with a display such as interactive directory, and the user can touch the room/destination he/she looks for. The robot then may start to give guidance to the room/place the user wanted. The robot may start detecting the moving object and maintain the distance with the moving object.

Figure 7A:
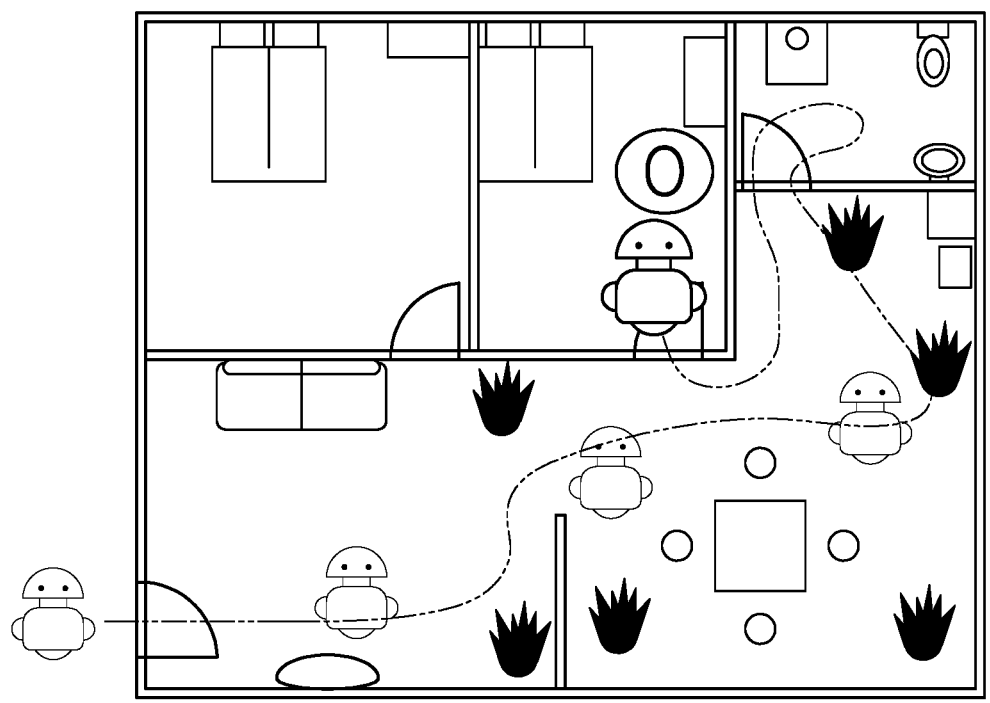
FIG. 7A shows a case illustrating a scenario of an autonomous robot deployed in a building.
Figure 7B:
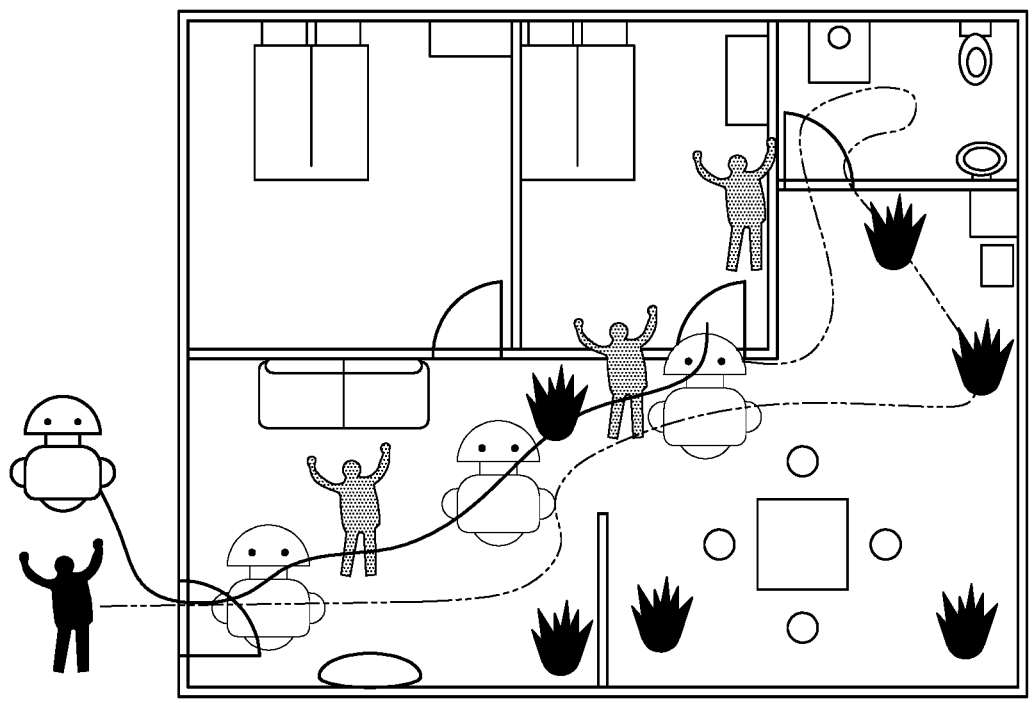
FIG. 7B shows a case illustrating a scenario of an autonomous robot rescuing a victim and finding an escape route.

FIGS. 7A and 7B illustrate how an autonomous robot is deployed in a disastrous area. Every day disaster happens around the world. Disaster can happen because of natural, technological, or social hazards. Some examples of common disaster happened around us are fire, flood, and earthquake. To prevent bigger casualties, immediate action is needed. For example, when fire happens in a building/house, a team of firefighters is usually deployed to find victims trapped inside the building. More lives are expected to be saved when the team tries to search each room in the building. In this situation, actually the rescue team is put into dangerous position. Many of them can be injured, or even lose their lives during the process. The building condition can be toxic, flammable, having dense smoke, and the building may collapse at any unpredicted time. There are also rare disasters happened, but resulting in high hazardous environment. For example, when an earthquake happened in Fukushima and tsunami hit the nuclear reactor. Radioactive radiation emitted from the reactor make it impossible for human to get into the building to analyze the casualties, and to do repair to the nuclear plant, or look for victims and evacuate them from the nuclear plant. These situations, where human lives can be put at risk, can be prevented by deploying a robot. A robot with custom specification may be made, for example, a robot that is heat resistant, a robot that can handle radiation emitted from the nuclear reactor, etc. The robot objective is simply to be able to scan entire rooms in the building, detect the possibilities of victims, and give direction guidance to be evacuated from the building.

In these illustrations, how an autonomous robot performs when deployed in disastrous areas is described. First, the robot may start a rangefinder sensor of the robot, and start to map the building. Once the partial map of the building is generated, the robot may move around to complete the map. During the movement of the robot, the same method of detecting an object that is moving is calculated using the RNN method. The rangefinder sensor has an advantage compared to other methods in detecting an object because the rangefinder result is not interfered by the smoke. In case that the robot is using a camera to detect an object, the robot may hardly detect anything because of the dense of the smoke. The result of the robot perception may be transmitted over wireless and displayed on a mobile device screen. When the robot detects movement of an object, which depends on the probability result of MOT, the robot may approach the target object, or continue to search for the entire rooms in the building. In case of the robot detecting of high probability of a moving object, and the robot approaching the object, a button or voice may be used to confirm that the victims need help as shown in FIG. 7A. The robot then tries to find a route to the entrance of the building, based on the routes/paths that have been memorized since the robot entering the building. During the movement, the robot will maintain a distance with the moving object to ensure that the victim is able to follow the robot as shown in FIG. 7B.

Figure 8:
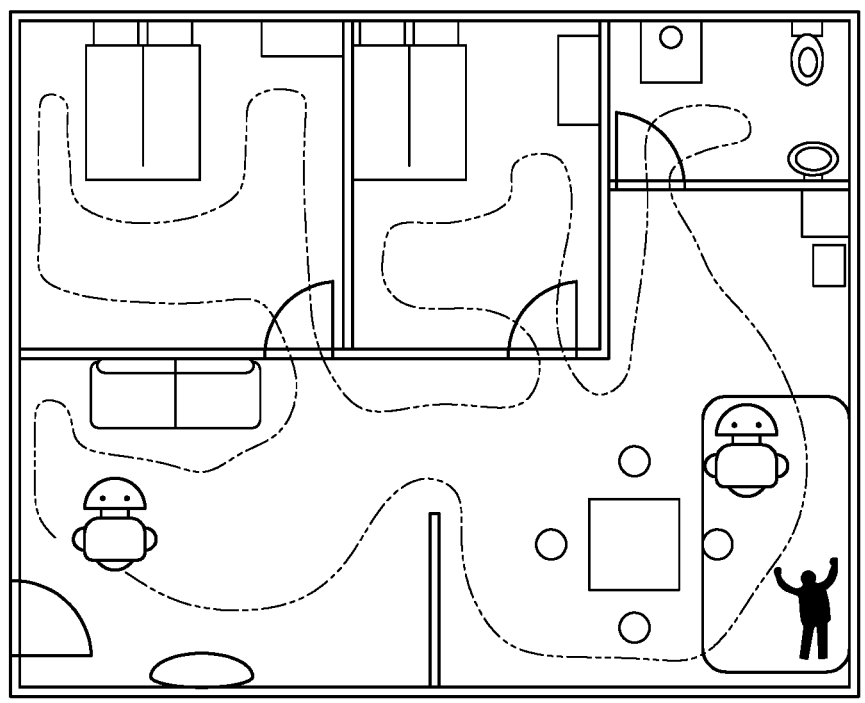
FIG. 8 shows a case illustrating a scenario of a surveillance autonomous robot finding a moving object and triggering an alarm/event.

FIG. 8 illustrates how an autonomous robot is used as a surveillance tool and triggers an alarm or event when a moving object is found. A lot of houses in city area are left empty during work hour because the occupants may have activities outside the houses. Both of the parents are now working and have to spend more time in the office rather than at home. The children are also attending school from morning, and go home in the afternoon or night. Their home will be left unattended in the afternoon. On the opposite, there are lots of buildings left unattended at night. Office, warehouse, school, and many other public building use a security officer to secure the building. The officer needs to patrol in scheduled time, moving from one room to another room, checking to make sure that there is no one entering the building without permission. This repetitive task is needed to be executed every day, repeating every few hours in the night. For a human, working every day at night continuously will impact his/her health issue. Human is naturally taking rest at night, by spending six to eight hours to sleep. That is why for security officers, they usually will have two shifts for working in the afternoon and in the night. Their work schedule is also rotated regularly to prevent health issue for working overnight every day. This task is suitable to be replaced by a surveillance robot. A robot may not need to sleep at night, and the robot may not be tired even when it is doing repetitive task. Using a robot also reduces safety risk when the robot finds suspicious objects/people. A robot may be more resistant to dangerous weapons, such as knife, explosive, or tear gas. People can be injured because of those dangerous weapons, but not with the robot. A robot may also be equipped with an alarm or trigger system, automatically sending data to a server for further analysis and logging. In case the robot cannot prevent an accident, the alarm and log data can be sent to the server. These data may be useful for further investigation.

As disclosed in FIG. 8, in this use case, an autonomous robot is deployed in a building or house. The robot may start to use a rangefinder sensor of the robot to build a map and start learning the result from the sensor data to identify objects within the room. 360 degree data from the rangefinder sensor may be processed by the robot to identify objects. The robot may move from one room to another room to create a complete map of the building. Once the map is completely created, the map may be used as the reference of objects within the building. The next task for the robot is to patrol inside the building. When the robot is moving, the rangefinder sensor may collect data simultaneously. The resulted data may be compared again with previous data (as a reference) using the RNN to determine whether there is a moving object. The result of the RNN is the probability that the object is a moving object. A certain threshold may be set to define that the robot needs to maintain a distance with the object. When the robot finds a moving object, an additional action may be executed by the robot, such as sending an alarm event to the server or taking a photo of the suspected object. The moving object is then set as a target object, and the robot needs to maintain a distance with the target object. When the target object is moving, the robot may just stay in a position of the robot if the robot and the target object are still within a certain distance. The robot may follow the target object in case that the object is moving away. The robot may predict the path and trajectory of the moving object using the rangefinder data collected from the sensor in the robot.

Figure 9:
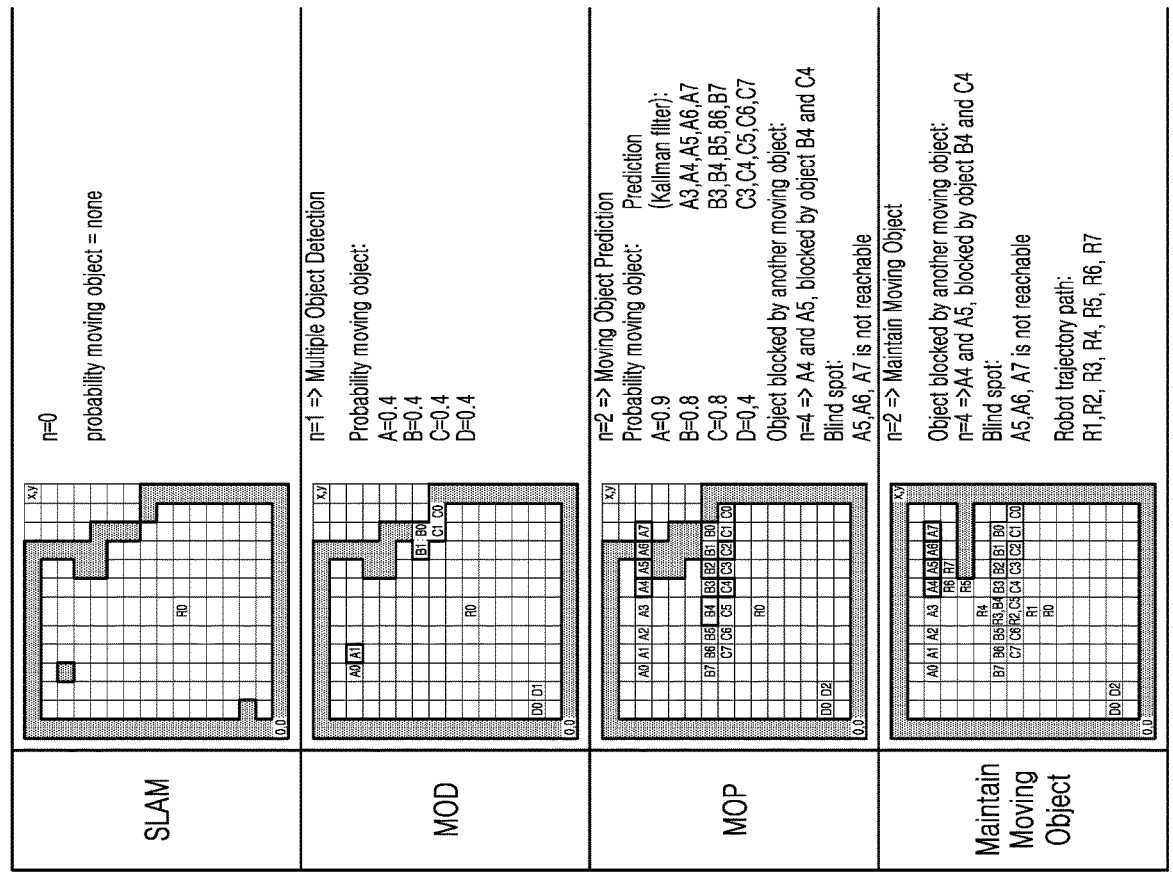
FIG. 9 illustrates an overall process diagram and a simple example of the system of FIG. 1 in accordance with an embodiment of the disclosure.
Figure 9:
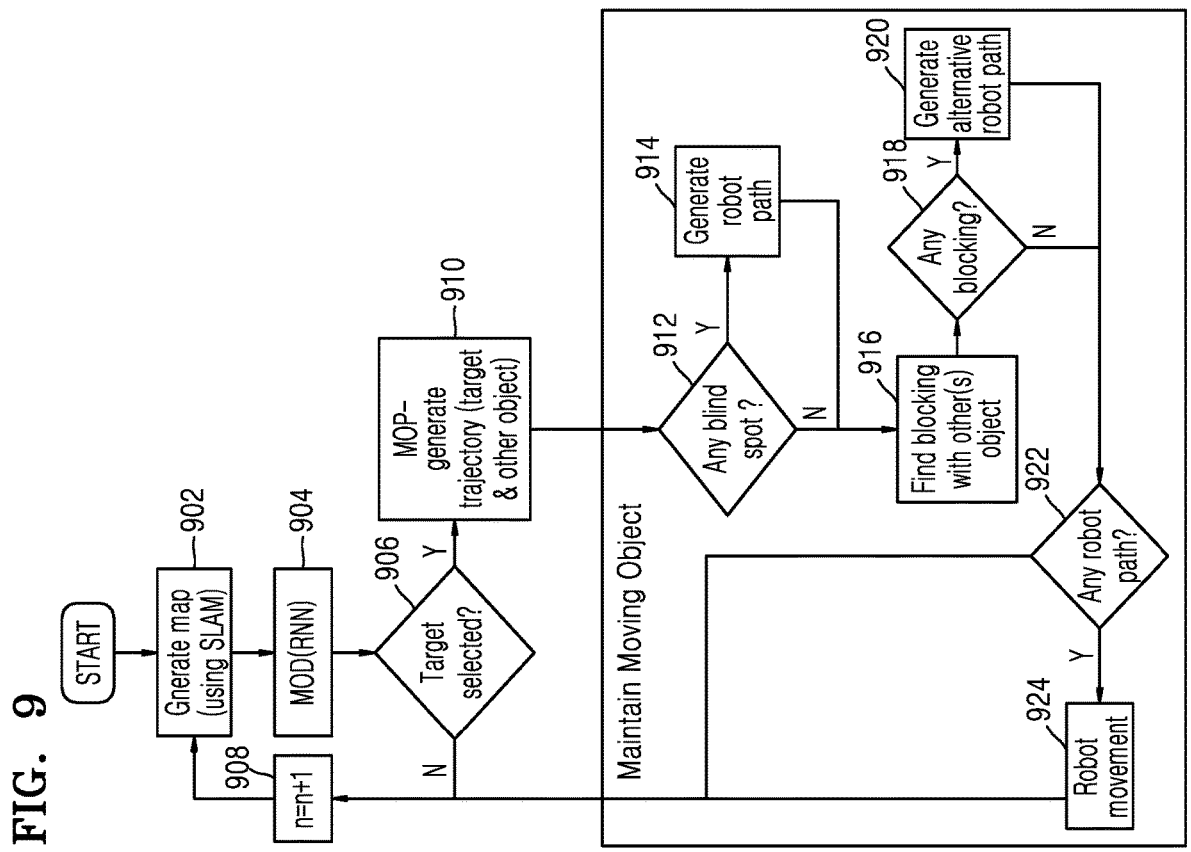

Referring now to FIG. 9, it shows an overall diagram process and a simple example of this disclosure. This disclosure is an end-to-end system that assembles machine learning methods and computational modules including Simultaneous Localization and Mapping (SLAM), Moving Object Tracking (MOT) which includes Moving Object Detection (MOD) and Moving Object Prediction (MOP), and Maintain Moving Object to provide recommendation path for the autonomous robot to maintain the target object of the autonomous robot.

As disclosed in FIG. 9, in step 902, the system may try to generate maps using a SLAM module at n=0.

In step 904, the system may detect a moving object by using the Moving Object Detection (MOD) module. For example, there is none of moving object detected by the system at n=0.

In step 906, the system may determine if a target object is selected.

In step 908, when the target object is not selected ('N' in step 906), the system may increase a value of 'n' by 1 and a flow my return back to the step 902.

For example, at n=1, using the Moving Object Detection (MOD) module, four possibilities of the moving object may be determined. These four objects are already moved, compared to their positions at n=0. Then at n=2, the system may recognize that there are three moving objects (A, B, C) with high probability based on their movement using MOD and the object A is selected by a user as a target object that needs to be maintained.

In step 910, the system may generate trajectory of the target object and other objects.

In step 912, the system may determine if there exists any blind spot. The blind spot may indicate areas that sensors of the robot may not reach because of obstacles. The obstacles may include either stationary objects or moving objects.

In step 914, when there exists a blind spot ('Y' in step 912), the system may generate a path of the robot.

In step 916, when none of blind spot exists ('N' in step 912), the system may find objects that block a sensing of the robot.

In step 918, the system may determine if there exists any blocking.

In step 920, when there exists blocking ('Y' in step 918), the system may generate alternative path of the robot.

In step 922, when none of blocking exists ('N' in step 918), the system may determine if there exists any path of the robot.

In step 924, when there exists the path of the robot ('Y' in step 922), the system may move a position of the robot. When none of the path of the robot exists ('N' in step 922), the flow may return back to step 908.

For example, the system may then generate the trajectory of every moving object until n=7. On MOP section as disclosed in FIG. 9, it can be seen that at n=7, an object A will go through outside the boundary and there will be blocking sight by objects B and C at n=4. By knowing those conditions, the robot may generate a path for itself to keep maintaining the object A. The path generated by the robot may be seen on Maintain Moving Object section in FIG. 9, which is R0, R1, up to R7. After generating the path, the robot may move and follow this path. The above process is repeated to keep maintaining a distance between the robot and the object A.

Figure 10:
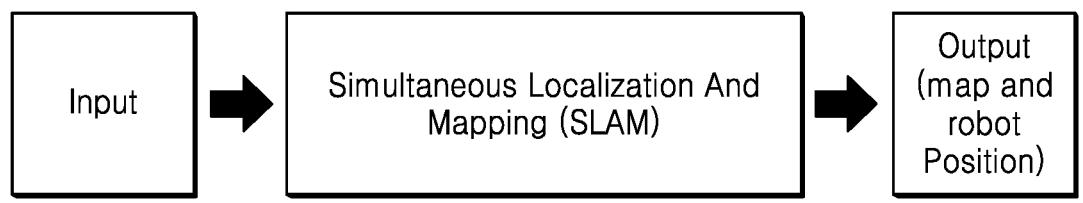
FIG. 10 illustrates a Simultaneous Localization and Mapping diagram in accordance with an embodiment of the disclosure.

As disclosed in FIG. 10, it shows a Simultaneous Localization and Mapping (SLAM) method used in this disclosure. Simultaneous Localization and Mapping (SLAM) is a concept of building a map of an unknown environment by an autonomous robot while the robot navigates the environment using the map. In the SLAM, both the trajectory of the robot and the map are estimated on-line without the need for any prior knowledge of location. The SLAM module may enable an autonomous robot to recognize environment of the autonomous robot through input data from sensors. The embodiment of the disclosure uses two sensors. Those are a rangefinder sensor as a perception sensor and an inertial measurement unit (IMU) as an orientation sensor. Perception may be done using only a rangefinder sensor such as LIDAR, sonar, etc. The rangefinder sensor is a surveying instrument for determining quickly the distances, bearings, and elevations of distant objects. Using distance data for several positions may give the robot information about environment of the robot. The IMU is a common electronic device used in a robot to measure an internal angular rate and an orientation of the body of the robot using a combination of accelerometers, gyroscopes, and sometimes magnetometers. Using an Inertial Measurement Unit (IMU) as an orientation sensor may give the robot information about a position of the robot on environment of the robot.

FIG. 11 through FIG. 14 disclose a set of processes of a SLAM method used in this disclosure. In the first step, an autonomous robot may scan the environment using a rangefinder sensor and build a map. As disclosed in FIG. 11, as the first step of this method, the robot may get input from the rangefinder sensor, and then create the map based on that input. The rangefinder sensor may get range of a closest object around the robot, so the right picture shows how the environment looks like from the robot's perspective. The robot cannot detect an object E because it is blocked by an object D.

Figure 11:
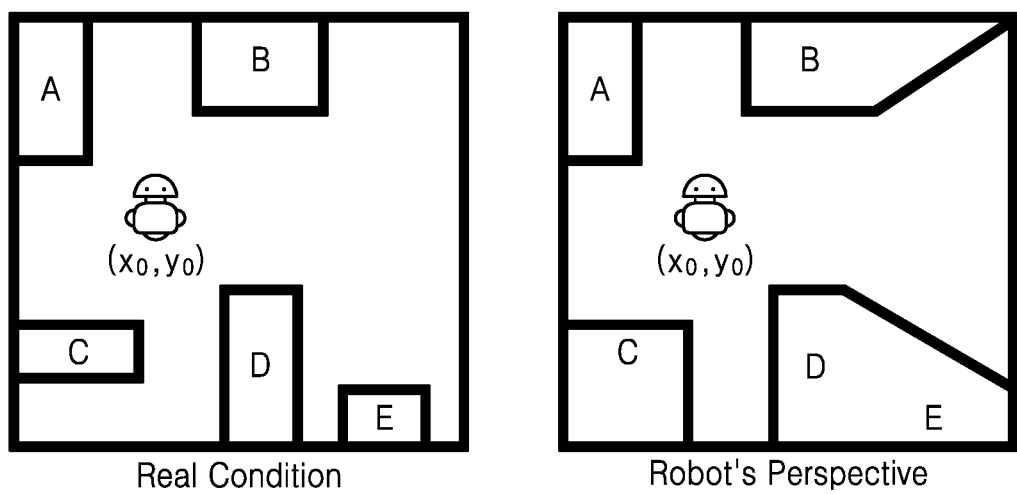
FIG. 11 illustrates how the system of FIG. 1 scans the environment and builds an initial map in accordance with an embodiment of the disclosure.
Figure 12:
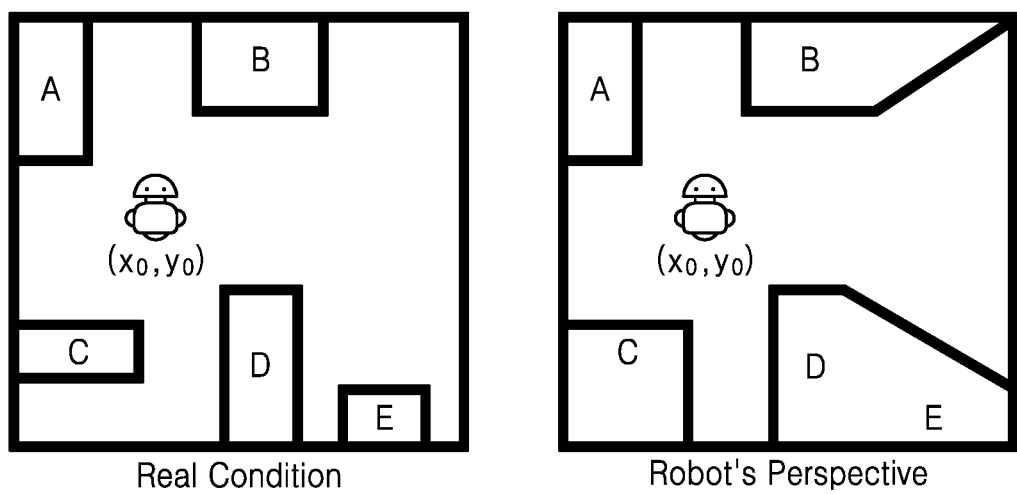
FIG. 12 illustrates how the system of FIG. 1 sets an initial robot position in accordance with an embodiment of the disclosure.

FIG. 12 discloses the second step of this disclosure on how the autonomous robot sets initial position (x0, y0) of the robot. This process is actually done simultaneously with the first step, as shown in FIG. 11, but, for easier understanding, the first step and the second step are separated. In the second step, the robot initializes a position (defined as (x0, y0)) of the robot.

Figure 13:
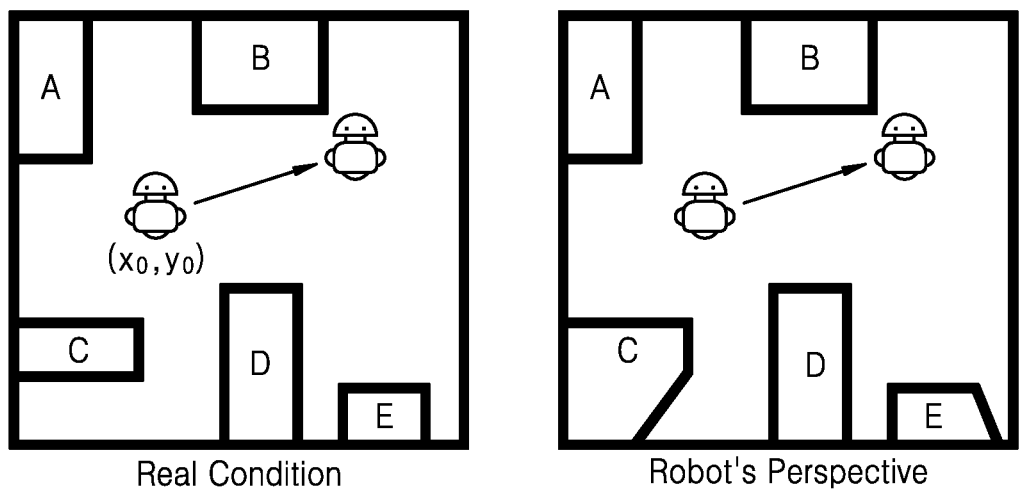
FIG. 13 illustrates how the system of FIG. 1 scans the environment and updates the map in accordance with an embodiment of the disclosure.

FIG. 13 discloses the third step of this disclosure on how the autonomous robot scans the environment again when the autonomous robot moves, and updates the map when new information is found. For example, the robot may move from (x0, y0) to another point. Then, perception of the robot would change as follows. After moving to a new point, the robot gets new perspective about the objects. The robot gets the right side of objects B and D so the robot gets full shapes of the objects B and D. Also it now can detect an object E. This new perspective is then updated to the map saved in the robot.

Figure 14:
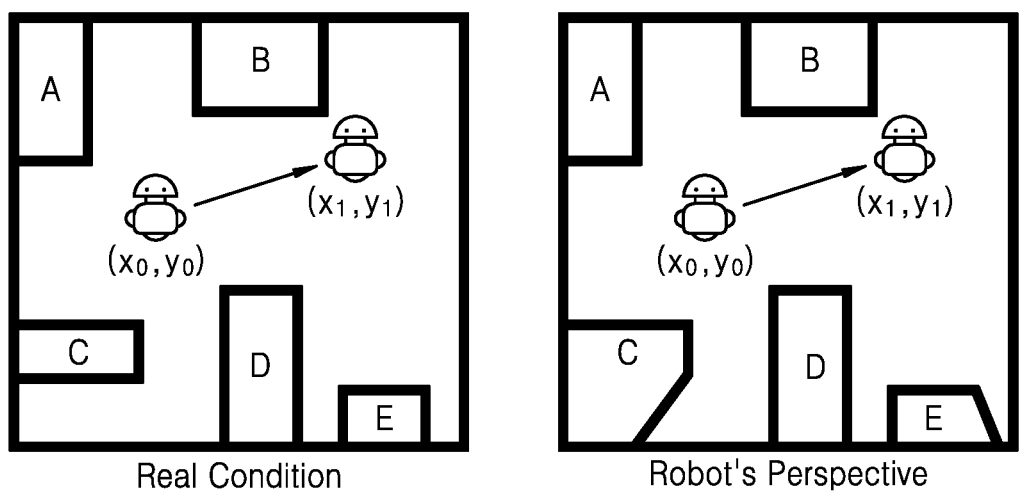
FIG. 14 illustrates how the system of FIG. 1 updates a current position of a robot in accordance with an embodiment of the disclosure.

Referring now to FIG. 14, the final step of this SLAM method shows an illustration how the autonomous robot updates the current position of the robot using IMU. Similar to the second step, as shown in FIG. 12, the final step is actually done simultaneously with the third step, as shown in FIG. 13. In the final step, the robot gets the current position of the robot using IMU (e.g., (x1, y1)). The IMU lets the robot know how long the robot moved and direction of the robot. The third and fourth steps are repeated until the robot completes the main task. It is noted that the more the robot moves, the more perspective the robot gets and the robot may generate a better map.

Figure 15:
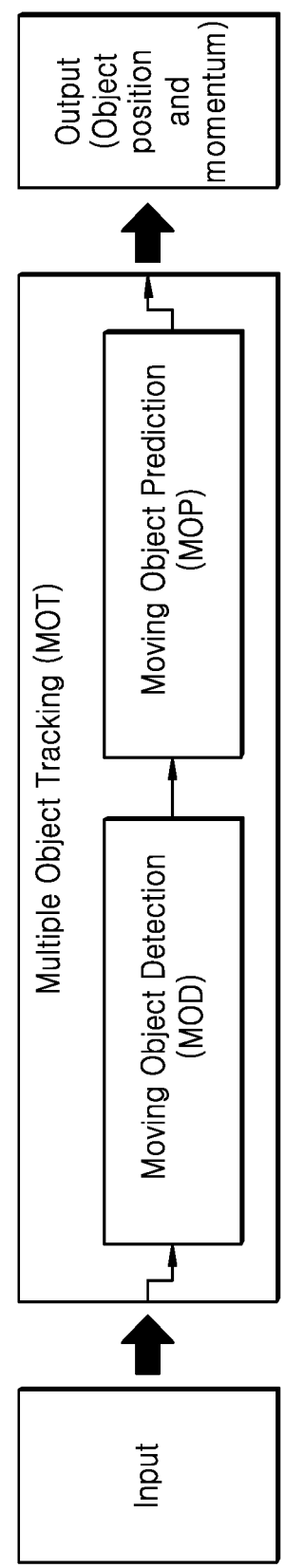
FIG. 15 illustrates a Multiple Object Tracking (MOT) diagram in accordance with an embodiment of the disclosure.

FIG. 15 discloses a Multiple Object Tracking (MOT) module of the disclosure, which includes two main components: Moving Object Detection component, hereinafter referred as MOD, and Moving Object Prediction component, hereinafter referred as MOP. Multiple Object Tracking, hereinafter referred as MOT, takes distance data from a rangefinder sensor to calculate object position and object momentum. The MOT uses the MOD module which uses Recurrent Neural Network (RNN) to determine an object position. The object position is used by the MOP to determine object momentum (speed and direction).

Figure 16:
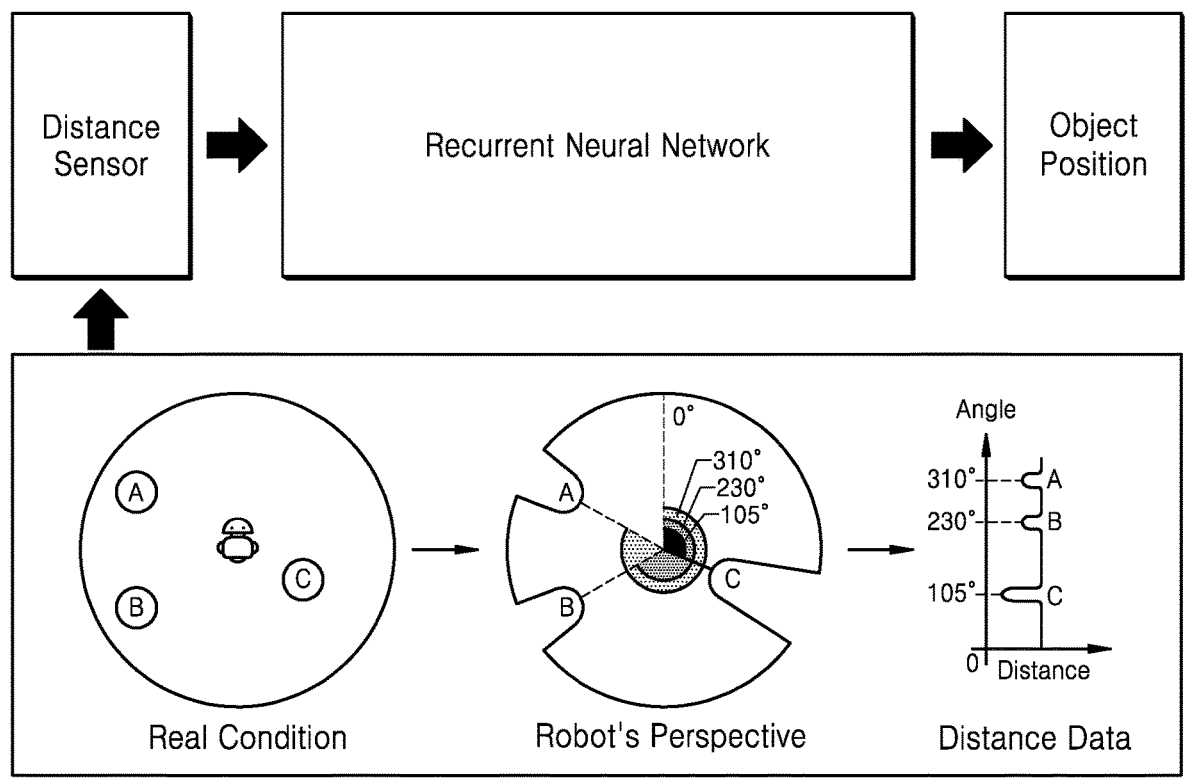
FIG. 16 illustrates a Moving Object Detection (MOD) diagram in accordance with an embodiment of the disclosure.

FIG. 16 discloses the MOD diagram where a method of how the embodiments of the disclosure detect a moving object is shown. The embodiment of the disclosure uses a Recurrent Neural Network (RNN) to determine the probability of an object by analyzing a pattern of movement of the object. Series of data of object movements are captured by the rangefinder sensor. Those series of outputs, which contain information of object locations, are fed into the RNN. The RNN may determine the probability of moving objects in certain location by analyzing their current and previous changes in distance data.

As disclosed in FIG. 16, there is a circle room with 3 objects; object A, object B, and object C. Using a distance sensor, the autonomous robot scans the surrounding area and yields distance data from 0° to 360°. Every acquired distance data is normalized to reference point. In FIG. 16, the robot stands exactly on reference point, and then distance data are fed into the RNN. The changes in distance data are caused by movements of the moving object such as certain pattern that people tend to have. Human does not move in random manner but human has a unique pattern, e.g., people when walking or running. The RNN may try to learn or find a pattern by analyzing changes in series of distance data. The limitation of a distance sensor which only captures distance information in one dimension can be a challenged in distinguishing and tracking movement of an object from surrounding of the object. The problems such as two or more objects intersect each other can be solved by taking historical movement data of objects into account. The RNN has state vector (cell state) that records relevant historical information that the RNN acquired from previous inputs. This state vector will help to track right objects when intersection occurs.

Figure 17:
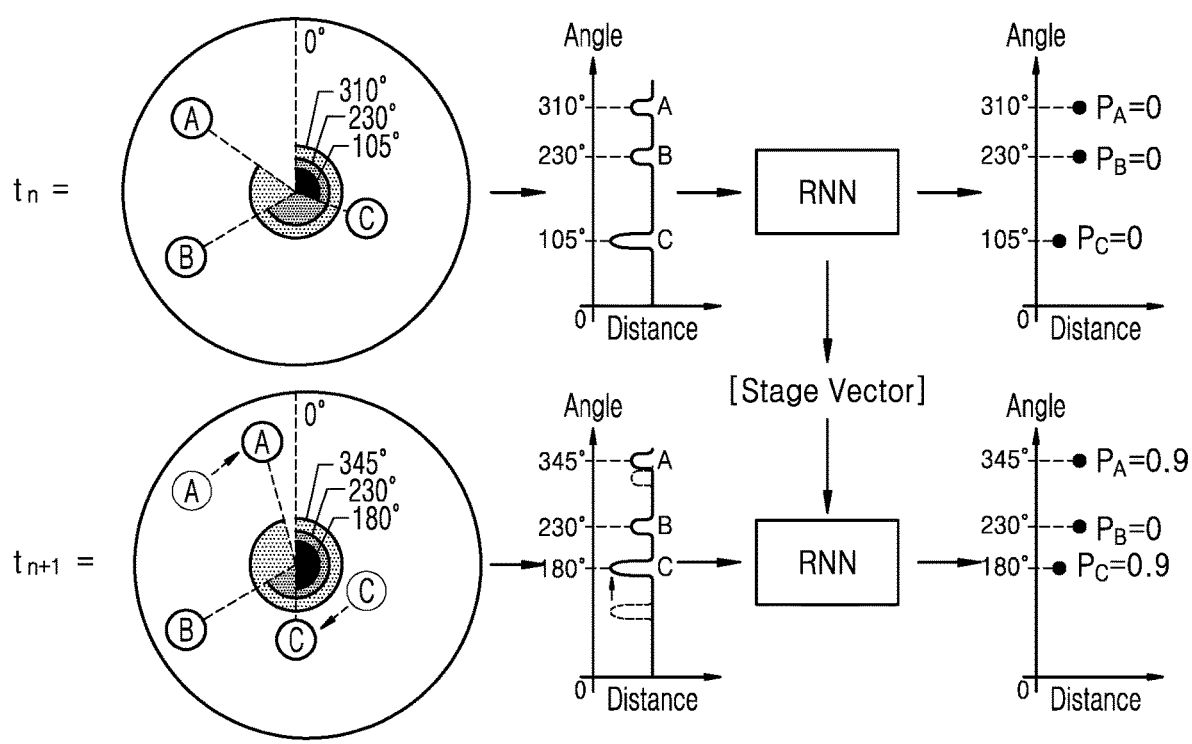
FIG. 17 illustrates a Moving Object Detection (MOD) detailed diagram in accordance with an embodiment of the disclosure.

FIG. 17 illustrates how the embodiment of the disclosure uses a RNN to detect a moving object. As an illustration, an autonomous robot is deployed in a circle room with 3 objects (object A, object B, and object C). At tn, there are no changes captured by the rangefinder sensor thus the object probability for A, B, and C is zero. At tn+1, the RNN captures changes from the rangefinder sensor on the objects A and C. Because the RNN has learned the pattern of distance data (movement patterns) and the movements of the objects A and C correspond to the learned pattern, the probability of the objects A and C will be close to 1. On the other hand, probability for the object B is zero because there are no changes captured on the object B. To train the RNN network to be able to detect a moving object, first, a series of outputs from the rangefinder sensor are fed into the RNN network. Each of those series of sensor outputs has a corresponding moving object label. By forward propagating the outputs from the rangefinder sensor and back propagating the error correction from its corresponding label, eventually the network will be able to learn the pattern of distance data of the moving object and locate the moving object.

Figure 18:
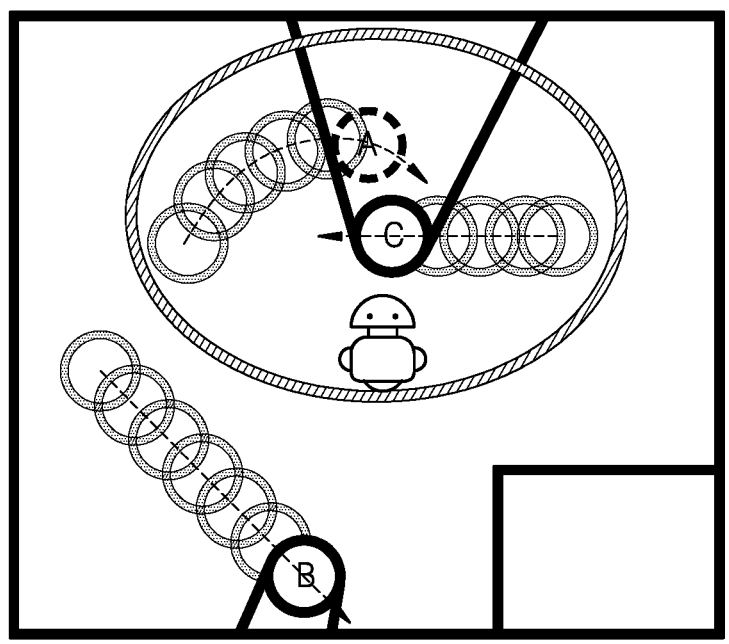
FIG. 18 illustrates an object blocked by another object in accordance with an embodiment of the disclosure.
Figure 19:
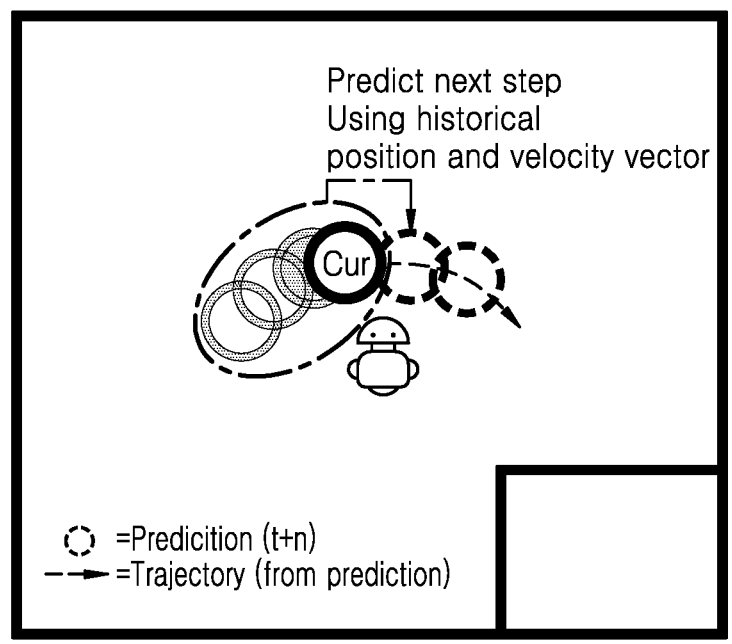
FIG. 19 illustrates a trajectory of a movement of an object in accordance with an embodiment of the disclosure.

Referring now to FIGS. 18 and 19, various illustrations of the Moving Object Prediction (MOP) are shown. The problem of tracking an object using a rangefinder sensor occurs when the object is blocked by another object, as shown in FIG. 18, where an object "A" is positioned behind an object "C". The rangefinder sensor is unable to detect the object "A"; therefore the track of the object A is lost. In order to solve the problem, the possibility of the next vector position of each object in blocked area, which may be referred to as moving object momentum, needs to be predicted. By knowing the momentum, the tendency of a direction and a speed of an object may be determined.

In this disclosure, trajectory of the object which is derived from outputs of a prediction method is generated. In this disclosure, a Kalman filter method, one of the well-known methods to predict and estimate object movement, is used. A predictor may use each object position and velocity from the previous method as the input vector for the predictor and may provide the next estimation of position and velocity vector. While estimating the next vector, the predictor may also update prediction matrix to get better prediction. To generate trajectory, the result of prediction matrix, which depends on length of the trajectory, is simulated over and over. The process will continue to repeat until the system has stopped.

FIG. 19 illustrates trajectory of movement of an object. The trajectory of the movement of the object may be determined by using X, which is the state matrix. In an embodiment, X is the position and velocity of each moving object. The predictor may calculate historical data of position and velocity of an object and generate trajectory over and over. The predictor may simulate the result based on prediction matrix. All steps are looping and will be calculated over time.

Figure 20:
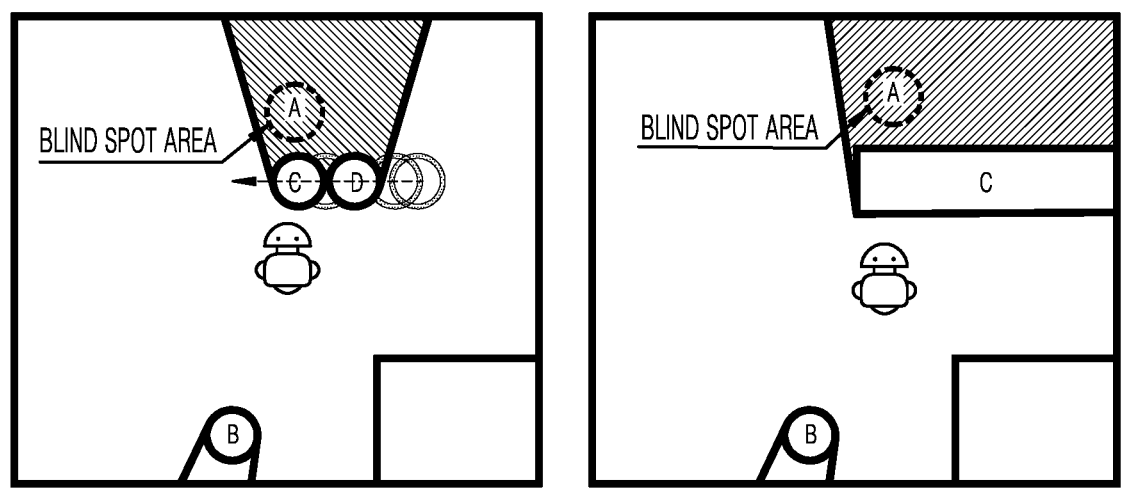
FIG. 20 illustrates an example of a blind spot area.

FIG. 20 illustrates how the Maintain Moving Object module is used to identify a possible blind spot area in an environment. At some cases, it can be hard to keep the probability of a position of a target object always in high value when it comes to the blind spot area. The blind spot area is one of the most challenging aspects for a robot especially when the robot only has one type of perception sensors. Since the robot may only use a rangefinder sensor as a perception sensor, the position of a target object can be blocked by another object. FIG. 20 illustrates use case scenarios when a target object and other objects meet at a same direction point and make a blind spot to the robot or when a position of the target object is blocked by some stationary object.

Figure 21:
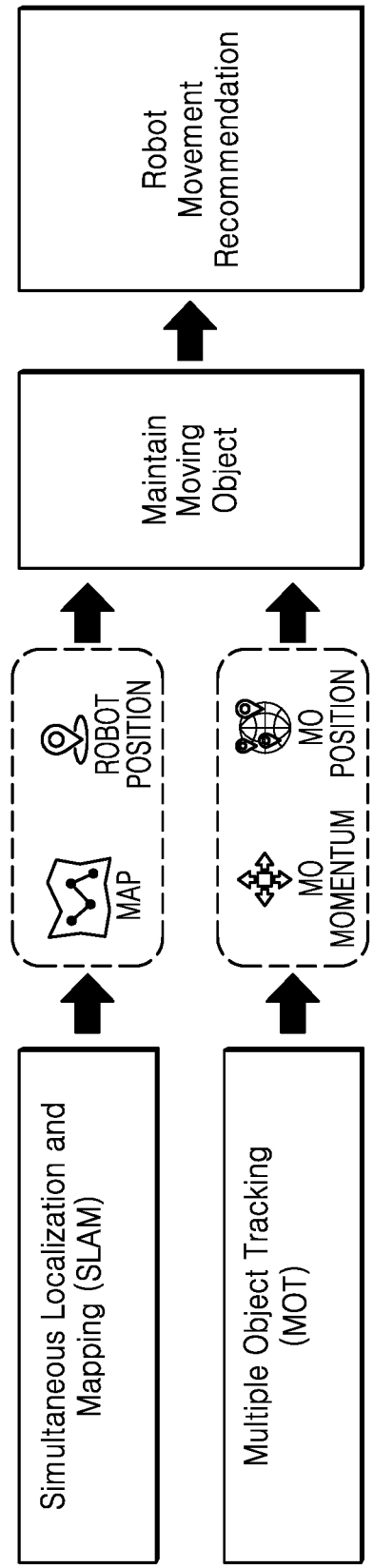
FIG. 21 illustrates a Maintain Moving Object diagram in accordance with an embodiment of the disclosure.

FIG. 21 discloses a Maintain Moving Object module diagram for overcoming use case scenarios when a target object moves to a blind spot area. This method may use SLAM and MOT as the input and produce recommendation action to a robot. The SLAM may provide the information of a map and a position of the robot while the MOT may provide the information about the possibility of a position and a momentum of a moving object. Based on the output from both methods, the robot may predict the trajectory of a movement of the target object and use the trajectory of the movement of the target object to check whether the target object will move to the blind spot area or not. When it possibly happens, the robot may calculate the best next position of the robot to keep monitoring the position of the target object.

Figure 22:
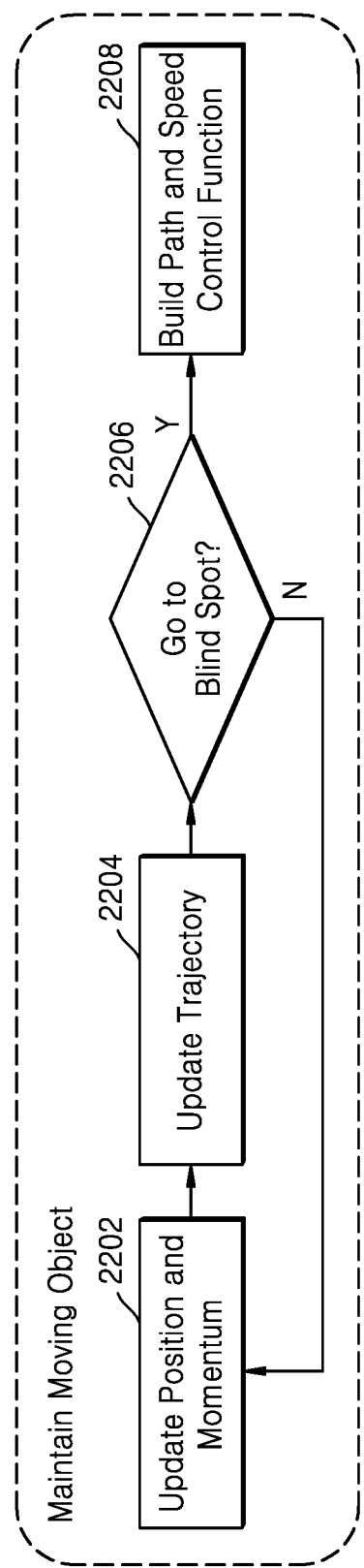
FIG. 22 illustrates a Maintain Moving Object process diagram in accordance with an embodiment of the disclosure.

FIG. 22 discloses a Maintain Moving Object module step by step process.

First, in step 2202, the system may continuously update the position and momentum of a target object and every moving object on a map.

In step 2204, then the robot may continuously update the trajectory of a movement of the target object over a certain period of time. The trajectory is based on a historical position of the target object.

In step 2206, the robot may determine if the robot moves to a blind spot area. When the robot does not move to the blind spot area ('N' in step 2206), a flow may return back to step 2202.

When the robot potentially moves to the blind spot area, the robot may determine the next position of the robot based on particular environment condition. The following are some of the sample use case scenarios the robot may encounter:

When the blind spot area has a temporary position and moves the opposite direction with the target object, the next position of the robot will be parallel with a prediction position of the target object.

When the blind spot area is caused by a stationary object or a position that has not been determined yet on the map, the next position of the robot will be the position of the target object.

In step 2208, the robot may build a trajectory path to move and control a speed of the robot based on the ability of movement, the speed of the robot, and the distance between the current position of the robot and the next position of the robot. The Maintain Moving Object module will enable the robot to execute the movement recommendation.

Figure 23A:
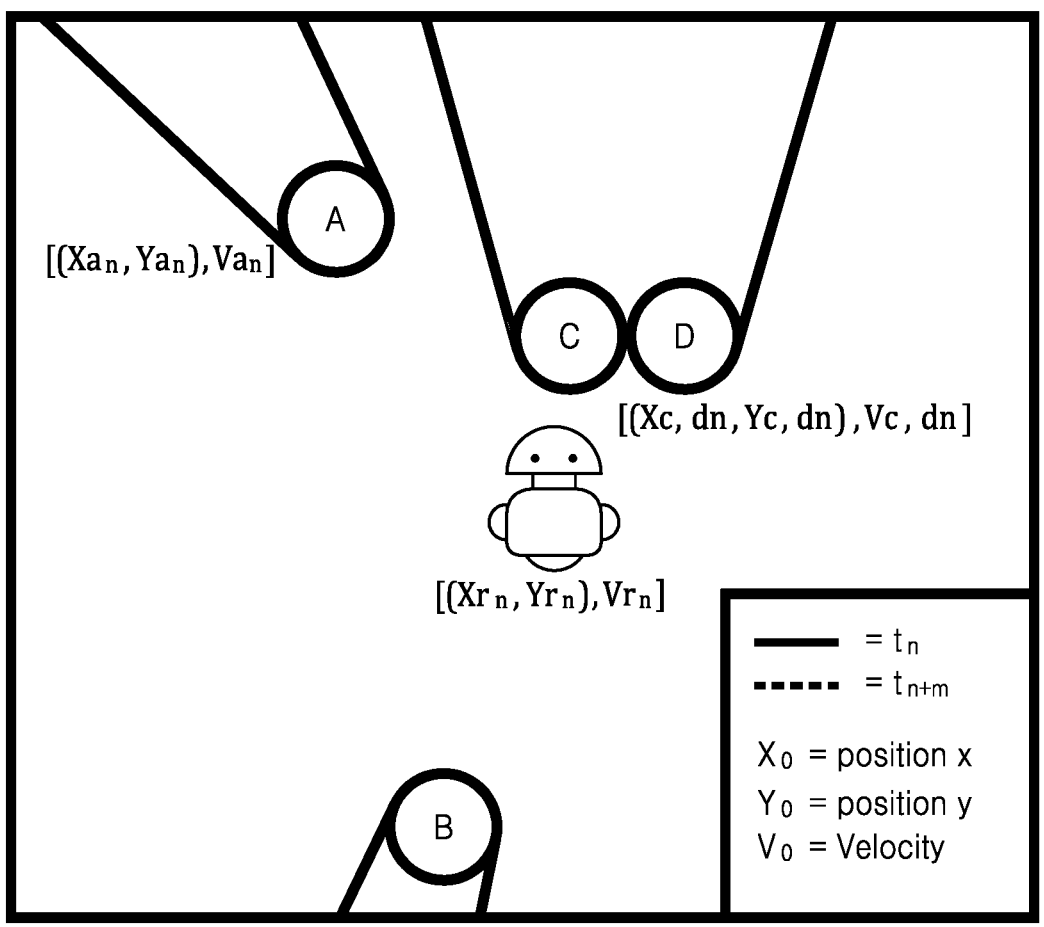
FIG. 23A illustrates how the system defines initial properties of a moving object in accordance with an embodiment of the disclosure.
Figure 23B:
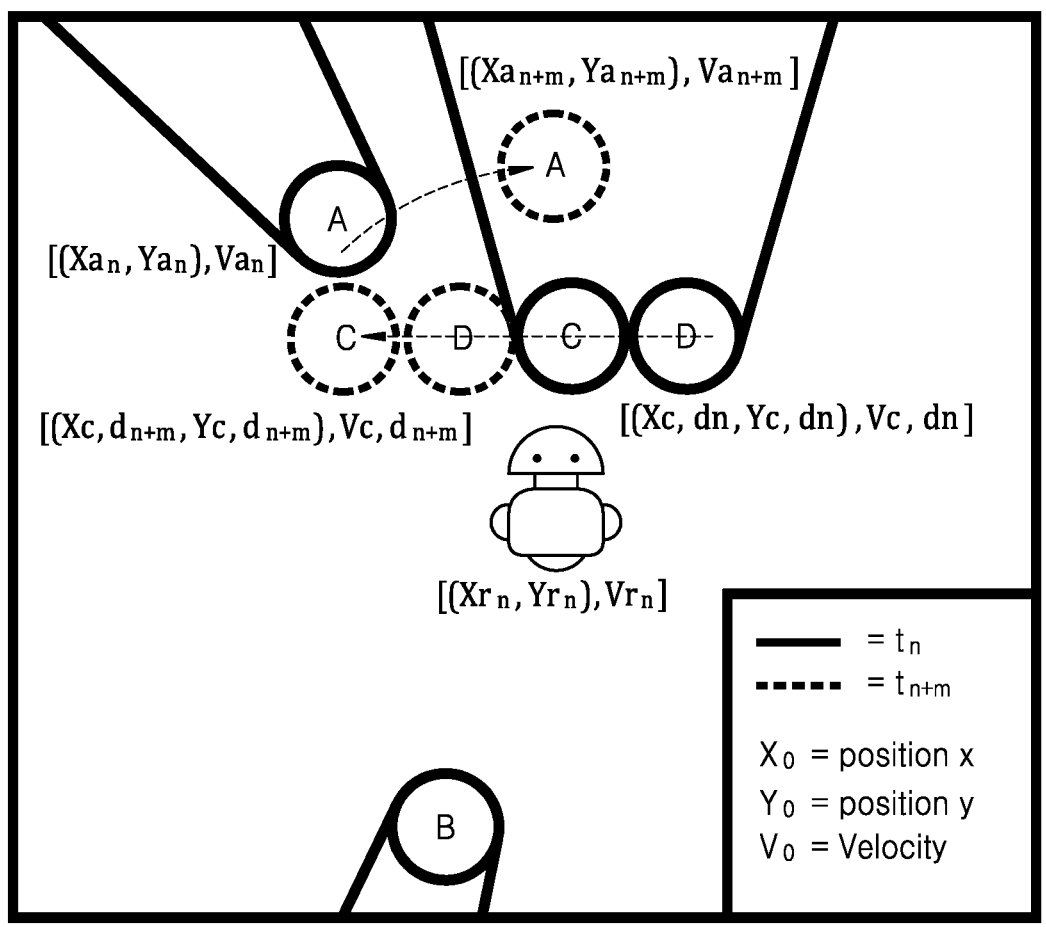
FIG. 23B illustrates how the system updates properties of the moving object in accordance with an embodiment of the disclosure.
Figure 23C:
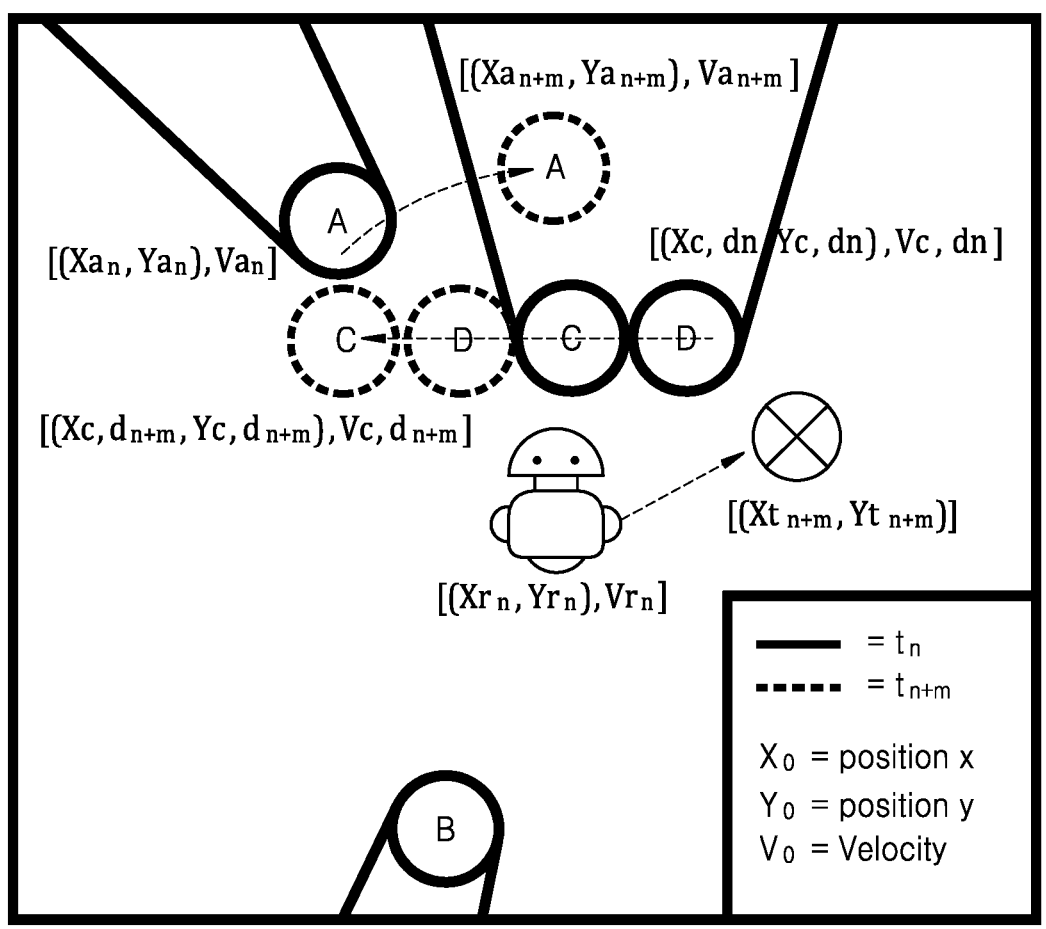
FIG. 23C illustrates how the system sets the next position of a robot to avoid losing a target object with motion's equation in accordance with an embodiment of the disclosure.

FIG. 23A through 23C illustrate various use case scenarios of how the Maintain Moving Object module works. FIG. 23A illustrates how the system defines initial properties of moving objects. For the initial condition, every moving object will have its own properties for position and velocity shown as the text near the objects. The initial position of the autonomous robot can be represented with $[(Xobject_n, Yobject_n), Vobject_n]$. Where $Xobject_n$=position of an object on X axis at time n, $Yobject_n$=position of an object on Y axis at time n, and $Vobject_n$=velocity value at time n. Next, as shown in FIG. 23B, the system may continuously update the trajectory of a movement of a moving object over a certain period of time, in this use case scenario, for example, at interval m. Using the trajectory, there is a possibility of the target object moving to a blind spot area at time n+m. Thus, the updated properties of the moving object would be represented with $[(Xobject_{n+m}, Yobject_{n+m}), Vobject_{n+m}]$.

Where $Xobject_{n+m}$=position of an object on X axis at time n+m, $Yobject_{n+m}$=position of an object on Y axis at time n+m, and $Vobject_{n+m}$=velocity value at time n+m. As the last step, as shown in FIG. 23C, the robot may set its next position to avoid losing the target object based on internal properties of the robot (position, initial and maximum speed, etc.), properties of the target object (position, trajectory, etc.), properties of other objects (position, trajectory, etc.), blind spot area, and other environment condition. In this disclosure, Fpath (t) is used as Function that builds a trajectory path for a robot to a target point based on time and Movement (t) is used as Function that controls a speed of the robot to the target point based on time. The system may calculate the moving path and method to move that fulfils the motion's equation as shown in equation 1 and equation 2 as follows.

$$\int_{t_n}^{t_{n+m}} d(x) = \int_{t_n}^{t_{n+m}} v \cdot dt \qquad \text{[equation 1]}$$

$$\int_{t_n}^{t_{n+m}} d(F_{path(t)}) = \int_{t_n}^{t_{n+m}} (F_{movement(t)}) \cdot dt \qquad \text{[equation 2]}$$

Figure 24:
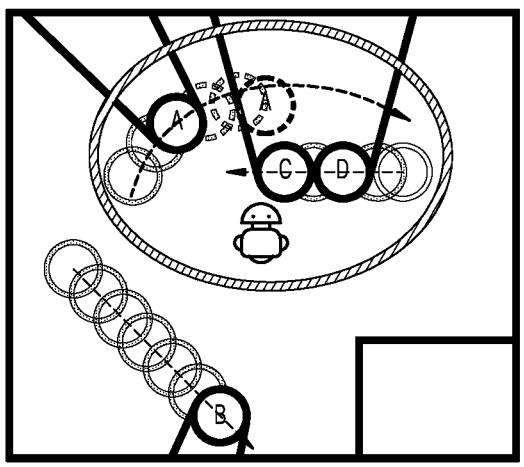
FIG. 24 illustrates how a robot moves when a target object is blocked by other objects while the robot is moving in accordance with an embodiment of the disclosure.
Figure 24:
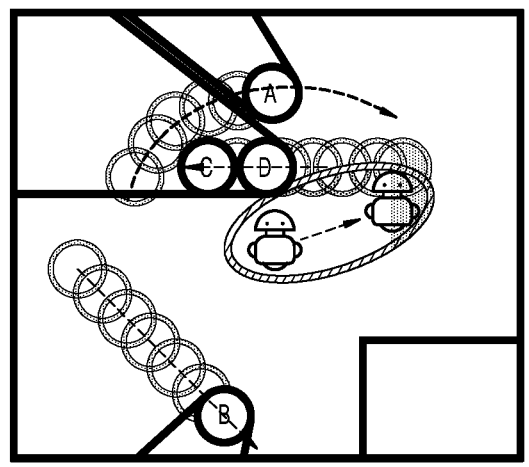

FIG. 24 illustrates a movement of a robot when a target object is blocked by other objects while the other objects are moving. When the target object's trajectory prediction possibly enters a blind spot area, this method will give recommendation to the robot to move to a certain point so the robot may have a better perception for maintaining the target position. Here are two cases that commonly happen in real world. As shown in FIG. 24, an object A is the target object, and both objects C and D, from a trajectory system of the disclosure, potentially block the position of the object A from perception of the robot. On the first image, the position of the target object A is potentially blocked by the movement of both the objects C and D. While on the second image, the robot may move to a certain point to get better perception and get higher possibility of position and momentum for the target object.

Figure 25:
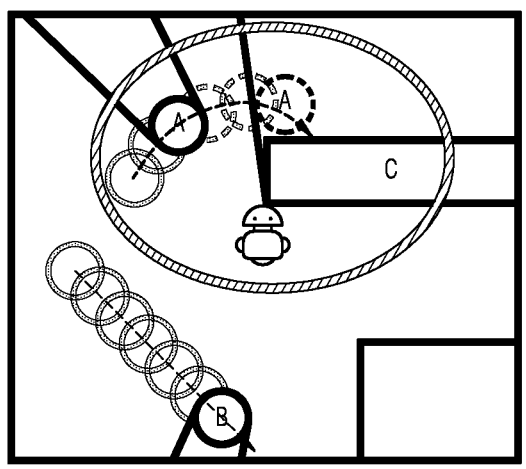
FIG. 25 illustrates how a robot moves when a target object has an unknown position.
Figure 25:
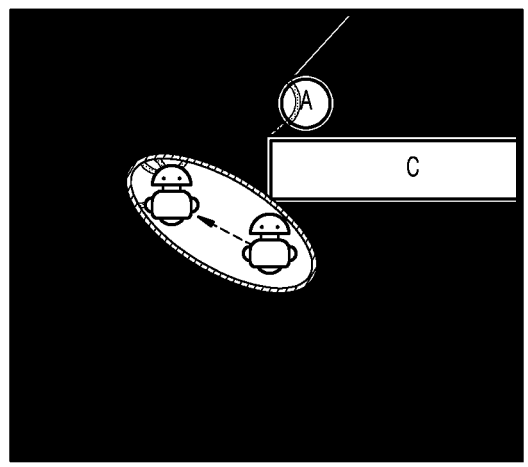

FIG. 25 illustrates use case scenarios of a movement of the robot when a position of a target object is unknown. In this illustration, an object A is the target object and an object C is a stationary object that has space and the robot still may not know the condition behind the object C. From prediction trajectory in this disclosure, the object A may move to behind the object C. On the first image, the position of the target object A is potentially blocked by the object C and the robot may still not know the condition behind the object C. While on the second image, the robot may move to some point to get better perception and get higher possibility of position and momentum for the target object.

Figure 26:
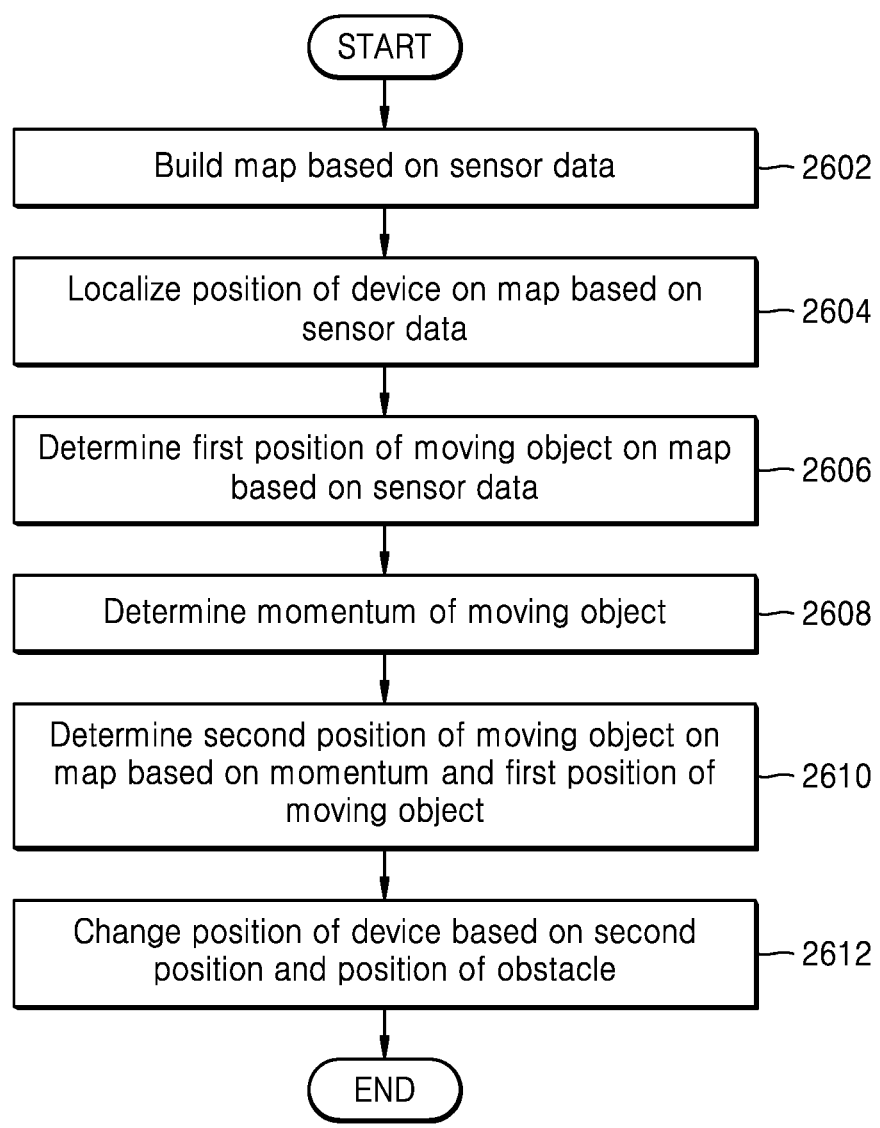

FIG. 26 illustrates a flow chart of a method of a device according to an embodiment of the disclosure.

In step 2602, a device may build a map based on sensor data. For example, the sensor data may include data collected by a perception sensor and an orientation sensor. The device may comprise a rangefinder sensor and an inertial measurement unit sensor which function as the perception sensor and the orientation sensor, respectively. The sensor data may be acquired in response to a selection of a main task by a user.

In step 2604, the device may localize a position of the device on the map. For example, the device may localize the position of the device based on the sensor data. According to an embodiment of the disclosure, the device may simultaneously build the map and localize the position of the device by using a Simultaneous Localization and Mapping (SLAM).

In step 2606, the device may determine a first position of the moving object at a first moment. Selectively, the first moment may indicate an initial position of the moving object. The device may determine the first position of the moving object at the first moment based on the sensor data. The device may detect the moving object based on the sensor data. The detecting of the moving object may comprise converting the sensor data into one-dimensional data, analyzing the one-dimensional data by using a Recurrent Neural Network (RNN) and determining a possibility that an object associated with the analyzed one-dimensional data is the moving object.

In step 2608, the device may determine a momentum of the moving object. For example, the device may determine a motion of the moving object. Selectively, the momentum may include a direction and a speed of the moving object. The device may determine the direction and the speed of the moving object by using a Kalman filter.

In step 2610, the device may determine a second position of the moving object at a second moment based on the determined momentum. Selectively, the second position may indicate a new position of the moving object after the moving object is moved from the initial position.

In step 2612, the device may change the position of the device based on the determined second position and a position of an obstacle. For example, change of the position of the device may comprise moving the device in case that the second position of the moving object is blocked by the obstacle. Selectively, the obstacle may include a stationary object and another moving object. In accordance with an embodiment of the disclosure, the device may change the position of the device when the obstacle is located between the position of the device and the second position of the moving obstacle, so that the device may be located at a position that enables the device to acquire sensor data associated with the moving object more precisely. The device may perform the main task based on the sensor data.

Figure 27:
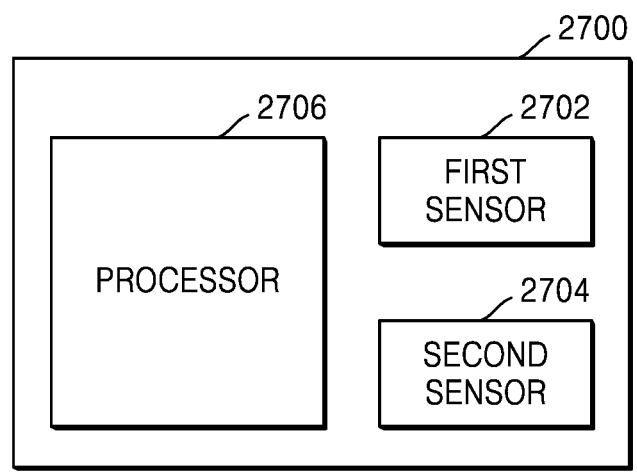
FIG. 27 illustrates a block diagram of a device in accordance with an embodiment of the disclosure.

FIG. 27 illustrates a block diagram of the device in accordance with an embodiment of the disclosure.

The device 2700 may include a first sensor 2702, a second sensor 2704 and a processor 2706.

The first sensor 2702 may include a rangefinder sensor. The rangefinder sensor may be a perception sensor. The rangefinder sensor may measure a distance between a position of the device 2700 and objects surrounding the device 2700. The rangefinder sensor may acquire sensor data in response to a selection of a main task by a user.

The second sensor 2704 may include an inertial measurement unit sensor. The inertial measurement unit sensor may be an orientation sensor. For example, the inertial measurement unit sensor may measure an internal angular rate and an orientation of the device 2700 by using a combination of accelerometers, gyroscopes and magnetometers. The inertial measurement unit sensor may acquire the sensor data in response to the selection of the main task by the user.

The processor 2706 may build a map based on sensor data collected from the first sensor 2702 and the second sensor 2704. The processor 2706 may localize the position of the device 2700 on the map. In accordance with an embodiment of the disclosure, the processor 2706 may simultaneously build the map and localize the position of the device 2700 by using Simultaneous Localization and Mapping (SLAM).

The processor 2706 may determine a first position of a moving object at a first moment. Selectively, the first moment may indicate an initial position of the device 2700. The processor 2706 may detect the moving object based on the sensor data. For example, the processor 2706 may covert the sensor data into one-dimensional data, analyze the one-dimensional data by using a Recurrent Neural Network (RNN), and determine a possibility that an object associated with the analyzed one-dimensional data is the moving object.

The processor 2706 may determine a momentum of the moving object. For example the processor 2706 may determine a motion of the moving object. Selectively, the momentum may include a direction and a speed of the moving object. For example, the processor 2706 may determine the direction and the speed of the moving object by using a Kalman filter.

The processor 2706 may determine a second position of the moving object at a second moment based on the determined momentum. Selectively, the second position may indicate a position of the moving object after the moving object is moved from the initial position.

The processor 2706 may change the position of the device 2700 based on the second position of the moving object and a position of an obstacle. Selectively, the obstacle may include a stationary object and another moving object. For example, the processor 2706 may move the device 2700 in case that the second position of the moving object is blocked by the obstacle. In accordance with an embodiment of the disclosure, the processor 2706 may change the position of the device 2700 when the obstacle is located between the position of the device 2700 and the second position of the moving obstacle, so that the device 2700 may be located in a position that enables the first sensor 2702 and the second sensor 2704 to acquire sensor data associated with the moving object more precisely. The processor 2706 may perform the main task based on the sensor data.

In one exemplary embodiment, the system and the method of an intelligent remote sensing system for autonomous robot navigation in dynamic environment to navigate a robot autonomously through a dynamic/unstructured environment with rangefinder sensors as perception sensors and inertial measurement unit sensors as primary orientation sensors are provided. The system and the method may assemble machine learning methods and computational model navigation by sensing, processing, and actuating all information captured by the sensors.

The system may comprise a perception sensor such as a rangefinder sensor and an orientation sensor such as an inertial measurement unit as the measurement sensors, where the rangefinder sensor is a single or compact in-direct distance measurement sensor that uses electromagnetic or mechanical waves to measure a distance, a Simultaneous Localization and Mapping (SLAM) module for generating real time mapping and localization of coordinates of objects within an environment without any prior knowledge of the location, where the real time mapping and the localization of the coordinates of objects are enabled based on inputs generated by the perception sensor and the orientation sensor, where the coordinates of objects may include a distance and orientation angle, a Multiple Object Tracking (MOT) module, which may function as a predictive system to calculate a series of measurements observed over time to estimate a state of a process and/or an object by calculating momentum of the object to provide recommendation of movement direction of the object and build a trajectory path based on a history position of the object, and a Maintain Moving Object module that may function as a recommendation system to maintain control of the robot's position with respect to the selected target object through various action recommendations to perform certain autonomous tasks such as tracking, following, and/or guiding a target object.

In an exemplary embodiment, the Multiple Object Tracking (MOT) module may comprise a Moving Object Detection (MOD) component for utilizing a Recurrent Neural Network (RNN) to perform object detection within an environment by analyzing movement pattern of an object while maintaining users' privacy data collected via the method, and a Moving Object Prediction (MOP) component for calculating an estimated future state of a process and/or the momentum of an object, where the outputs from the MOD component may be used as the input of the predictor to produce the next estimation of vector position and predict a trajectory movement path of the target object.

The system may use the Maintain Moving Object module to continuously update the position and velocity of both the target object and every object identified within an environment and provide the next point position for the autonomous robot. The method may comprise utilizing outputs from the Simultaneous Localization and Mapping (SLAM) module to generate real time mapping and localization of coordinates of the autonomous robot within an environment and continuously update the information, utilizing outputs from the Multiple Object Tracking (MOT) module to determine a probability of position and momentum of all moving objects, performing automatic detection for every moving object within an environment, where properties of an object may include position and speed at n time as the initial condition is captured, identifying a position and a velocity of the robot at n time at the initial condition, where the system may continuously measure a position and a velocity of each of moving objects and the robot observed over time at certain interval, generating a predictive trajectory path of a movement of the selected target object by calculating historical data of position, velocity, and movement of the target object to provide the next estimated position and velocity vector of the target object at a certain time interval, generating a predictive trajectory path of the next position of the robot by calculating internal properties of the robot including a position, velocity, initial and maximum speed, and properties of all objects within an environment to determine a trajectory path to control movement direction and speed of the robot to move toward the selected target point at a certain time internal and at a certain distance between current and next positions of the robot, and processing and learning all information continuously fed into the system to update predictive trajectory path for both the robot and the selected target object to maintain the position of the robot with respect to the selected target object.

In an exemplary embodiment, when a selected target object moves into a blind-spot area, in which a predicted position of the selected target object cannot be determined, the system may identify if the target object and other objects meet at the same direction point, and/or a position of the target object is blocked by some stationary objects, and/or the map construction is not fully finished, where when the blind spot area has a temporary position and moves the opposite direction with respect to the target object, the next position of the robot may be parallel with predicted position of the target object, and where when the blind spot area is caused by a stationary object or a position that has not been determined yet on the map, the next position of the robot may be the position of the target object. The system may measure and compare properties of the target object, properties of other objects, and properties of the robot properties within an environment to determine which spaces will be closed, where a distance between the selected target object and the robot is set at a certain distance.

In another embodiment, a system and a method of an advanced intelligent remote sensing system for robots to navigate autonomously through a dynamic/unstructured environment with only rangefinder sensors as perception sensors and inertial measurement units as orientation sensors are provided.

In an exemplary method, the system assembles machine learning methods and computational navigation calculation in robotic automation, to perform perception sensing, processing, and actuating a model robot predictive controller to enable autonomous robot navigation while maintaining users' privacy and can be widely adopted by any mobile autonomous robots.

Embodiments have been described with reference to flowchart illustrations and/or block diagrams of methods, apparatus, systems, and computer program products. In some cases, each block of such illustrations/diagrams, or combinations thereof, can be implemented by computer program instructions. The computer program instructions when provided to a processor produce a machine such that the instructions, which executed via the processor, create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatuses, or other devices to function in a particular manner, such that the instructions stored in the computer readable medium produce an article of manufacture including instructions which implement the function/act specified in the flowchart and/or block diagram block(s).

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium (e.g., a non-transitory computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some cases, aspects of one or more embodiments are described above with reference to flowchart illustrations and/or block diagrams of methods, apparatuses (systems), and computer program products. In some instances, it will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block(s).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block(s).

The computer program instructions may also be loaded onto a computer, other programmable data processing apparatuses, or other devices to cause a series of operational steps to be performed on the computer, other programmable apparatuses, or other devices to produce a computer implemented process such that the instructions which execute on the computer or other programmable apparatuses provide processes for implementing the functions/acts specified in the flowchart and/or block diagram block(s).

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of AIA 35 U.S.C. section 112(f) unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, and is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof, other versions are possible. Therefore, the spirit and scope of the appended claims should not be limited to the description of the preferred versions contained herein.

What is claimed is:

1. An operating method of a device, the operating method comprising:
    building a map based on sensor data;
    localizing a position of the device on the map based on the sensor data;
    detecting a moving object among a plurality of objects based on the sensor data;

determining a first position of the moving object on the map based on the sensor data;
determining a momentum of the moving object;
determining a second position of the moving object on the map based on the determined momentum and the determined first position; and
changing the position of the device based on the determined second position of the moving object and a position of at least one obstacle,
wherein the sensor data includes distance data of each of the plurality of objects obtained by a rangefinder sensor of the device, the distance data indicating a distance between the device and each of the plurality of objects, and
wherein the detecting of the moving object comprises:
inputting the obtained distance data into a Recurrent Neural Network (RNN),
analyzing a pattern of movement of each of the plurality of objects based on the obtained distance data by using the RNN,
determining the moving object among the plurality of objects based on the analyzed pattern of the movement by using the RNN.

2. The operating method of claim 1, wherein the moving object is moved from the first position to the second position.

3. The operating method of claim 1, wherein the sensor data includes data acquired by a perception sensor and an orientation sensor.

4. The operating method of claim 1, wherein the building of the map and the localizing of the position of the device are performed simultaneously by using Simultaneous Localization and Mapping (SLAM).

5. The operating method of claim 1, wherein the determining of the momentum comprises determining a speed and a direction of the moving object by using a Kalman filter.

6. The operating method of claim 1, wherein the changing of the position of the device comprises:
moving the device based on the second position of the moving object being blocked by the at least one obstacle.

7. The operating method of claim 6, wherein the at least one obstacle includes a stationary object and another moving object.

8. The operating method of claim 1, further comprising:
acquiring the sensor data in response to a selection of a main task.

9. The operating method of claim 8, further comprising:
performing the main task based on the acquired sensor data.

10. A device comprising:
a first sensor;
a second sensor; and
at least one processor,
wherein the at least one processor is configured to:
build a map based on sensor data acquired by the first sensor and the second sensor;
localize a position of the device on the map based on the acquired sensor data;
detect a moving object among a plurality of objects based on the sensor data;
determine a first position of the moving object on the map based on the acquired sensor data;
determine a momentum of the moving object;
determine a second position of the moving object on the map based on the determined momentum and the determined first position; and
change the position of the device based on the determined second position of the moving object and a position of at least one obstacle,
wherein the first sensor comprises a rangefinder sensor, and
wherein the at least one processor is further configured to:
obtain distance data of each of the plurality of objects by the rangefinder sensor, the distance data indicating a distance between the device and each of the plurality of objects, and
input the obtained distance data into a Recurrent Neural Network (RNN),
analyze a pattern of movement of each of the plurality of objects based on the obtained distance data by using the RNN, and
determine the moving object among the plurality of objects based on the analyzed pattern of the movement by using the RNN.

11. The device of claim 10, wherein the moving object is moved from the first position to the second position.

12. The device of claim 10, wherein the first sensor is a perception sensor and the second sensor is an orientation sensor, and
wherein the perception sensor includes the rangefinder sensor and the orientation sensor includes an inertial measurement unit sensor.

13. The device of claim 10, wherein the at least one processor is further configured to simultaneously build the map and localize the position of the device by using Simultaneous Localization and Mapping (SLAM).

14. The device of claim 10, wherein the at least one processor is further configured to determine a speed and a direction of the moving object by using a Kalman filter.

15. The device of claim 10, wherein the at least one processor is further configured to move the device based on the second position of the moving object being blocked by the at least one obstacle.

16. The device of claim 15, wherein the at least one obstacle includes a stationary object and another moving object.

17. The device of claim 10, wherein the first sensor and the second sensor are each configured to acquire the sensor data in response to a selection of a main task, and
wherein the at least one processor is further configured to perform the main task based on the acquired sensor data.

18. A non-transitory computer-readable recording medium having recorded thereon a program for executing the operating method of claim 1.

19. The operating method of claim 1, further comprising:
predicting a trajectory of the moving object on the map based on the sensor data;
determining whether the moving object is to move to a blind spot area on the map, based on the trajectory of the moving object;
in case that the moving object is to move to the blind spot area on the map, determining a next position of the device based on a position of the blind spot area; and
determining a path of the device based on a speed of the device and a distance between the position of the device and the next position of the device.

20. The operating method of claim 19, wherein the determining of the next position of the device comprises:

determining the next position of the device to be a first position based on the blind spot area moving in relation to the moving object; and determining the next position of the device to be a second position based on the blind spot area being fixed on the map.

\* \* \* \* \*